United States Patent
Taoda

(10) Patent No.: US 6,480,295 B1
(45) Date of Patent: Nov. 12, 2002

(54) IMAGE FORMING APPARATUS FOR EFFICIENTLY STORING DEVELOPED PRINT DATA DEPENDING ON SITUATIONS AND AN IMAGE FORMING METHOD THEREOF

(75) Inventor: Masami Taoda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/196,736

(22) Filed: Nov. 20, 1998

(30) Foreign Application Priority Data

Dec. 11, 1997 (JP) .............................................. 9-341292

(51) Int. Cl.$^7$ ............................................... G06K 15/02
(52) U.S. Cl. ...................... 358/1.16; 358/1.15; 358/1.13
(58) Field of Search ........................ 358/1.1, 1.2, 1.13, 358/1.14, 1.15, 1.16, 1.17, 1.18, 404, 444, 296, 523, 524

(56) References Cited

U.S. PATENT DOCUMENTS

| | | | |
|---|---|---|---|
| 5,680,521 A | * 10/1997 | Pardo et al. ................ | 358/1.12 |
| 5,987,230 A | * 11/1999 | Shimizu ...................... | 358/1.16 |
| 6,014,224 A | * 1/2000 | Mitani ........................ | 358/1.16 |

* cited by examiner

Primary Examiner—Mark Wallerson
(74) Attorney, Agent, or Firm—Foley & Lardner

(57) ABSTRACT

An image forming apparatus has a preparation function of preparing print data for every page corresponding to inputted code data, a memory area for storing the print data prepared by the preparing function, a printer function of performing printing corresponding to the print data stored in the memory area when there is any print data stored in the memory area, or corresponding to the print data prepared by the preparation function when no print data is stored by the storage function, and a control circuit for comparing a data amount of the print data with an empty capacity of the memory area and for controlling the memory area so as to store the print data when the empty capacity is larger than the data amount or for controlling the storage area so as not to store the print data and controlling thereafter each means such that the data amount is not compared with the empty capacity when the data amount is smaller than the empty amount.

17 Claims, 17 Drawing Sheets

| |
|---|
| PROGRAM DATA |
| FONT DATA |
| : |
| DOCUMENT1   CODE DATA |
| DOCUMENT1-PAGE1  IMAGE DATA |
| DOCUMENT1-PAGE2  IMAGE DATA |
| DOCUMENT1-PAGE3  IMAGE DATA |
| DOCUMENT1-PAGE4  IMAGE DATA |
| DOCUMENT2   CODE DATA |
| DOCUMENT2-PAGE1  IMAGE DATA |
| DOCUMENT2-PAGE2  IMAGE DATA |
| DOCUMENT3-PAGE1  IMAGE DATA |
| DOCUMENT3-PAGE2  IMAGE DATA |
| DOCUMENT3-PAGE3  IMAGE DATA |
| DOCUMENT4   CODE DATA |
| TEMPORARY STORAGE AREA |
| MANAGEMENT INFORMATION |

FIG. 6

| DOCUMENT NAME | PRESENCE/ ABSENCE OF CODE DATA | PRESENCE/ ABSENCE OF IMAGE DATA | PAGES | PAGE | SECTOR No. | VOLUME | RENDERING TIME |
|---|---|---|---|---|---|---|---|
| DOCUMENT 1 | 1 | 1 | 4 | CODE | 10000 | 20KB | - |
| | | | | PAGE1 | 10020 | 15MB | 180s |
| | | | | PAGE2 | 25020 | 20MB | 220s |
| | | | | PAGE3 | 45020 | 10MB | 45s |
| | | | | PAGE4 | 55020 | 5MB | 25s |
| DOCUMENT 2 | 1 | 1 | 2 | CODE | 60020 | 5KB | - |
| | | | | PAGE1 | 60025 | 35MB | 600s |
| | | | | PAGE2 | 95025 | 60MB | 300s |
| DOCUMENT 3 | 0 | 1 | 3 | PAGE1 | 155025 | 10MB | 120s |
| | | | | PAGE2 | 165025 | 3MB | 15s |
| | | | | PAGE3 | 168025 | 25MB | 140s |
| DOCUMENT 4 | 1 | 0 | 5 | CODE | 193025 | 30KB | - |

FIG. 7

| PAGE | STORAGE INTO HDD | SECTOR No. | VOLUME | RENDERING TIME | DELETION OF OTHER DOCUMENTS |
|---|---|---|---|---|---|
| PAGE1 | 1 | 200000 | 12MB | 30s | 0 |
| PAGE2 | 1 | 212000 | 20MB | 150s | 0 |
| PAGE3 | 0 | - | 16MB | 100s | 0 |
| PAGE4 | 0 | - | 5MB | 10s | 0 |

FIG. 8

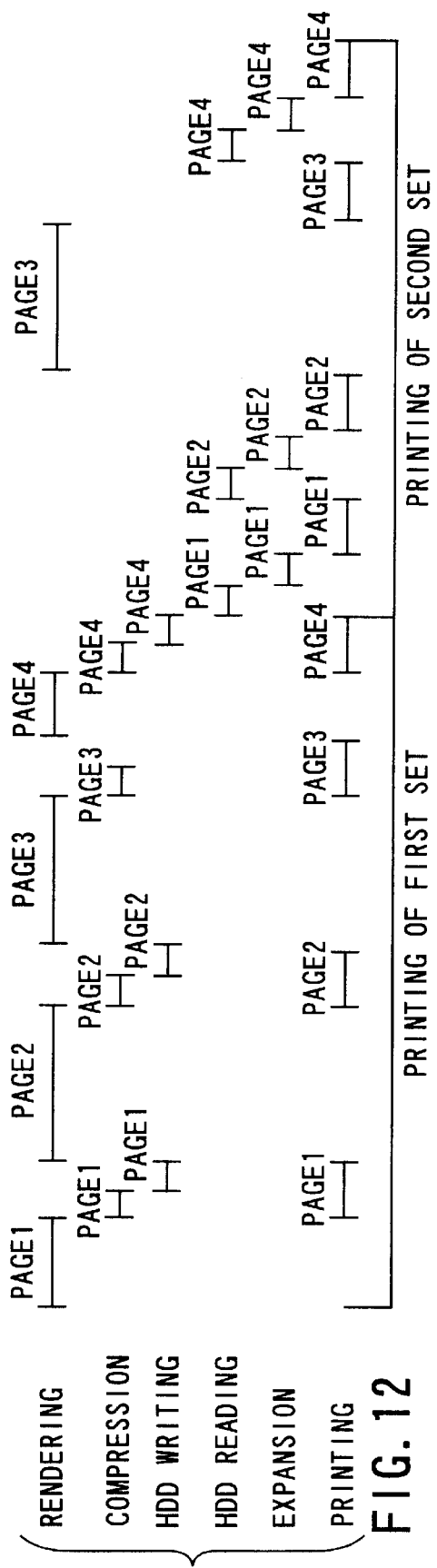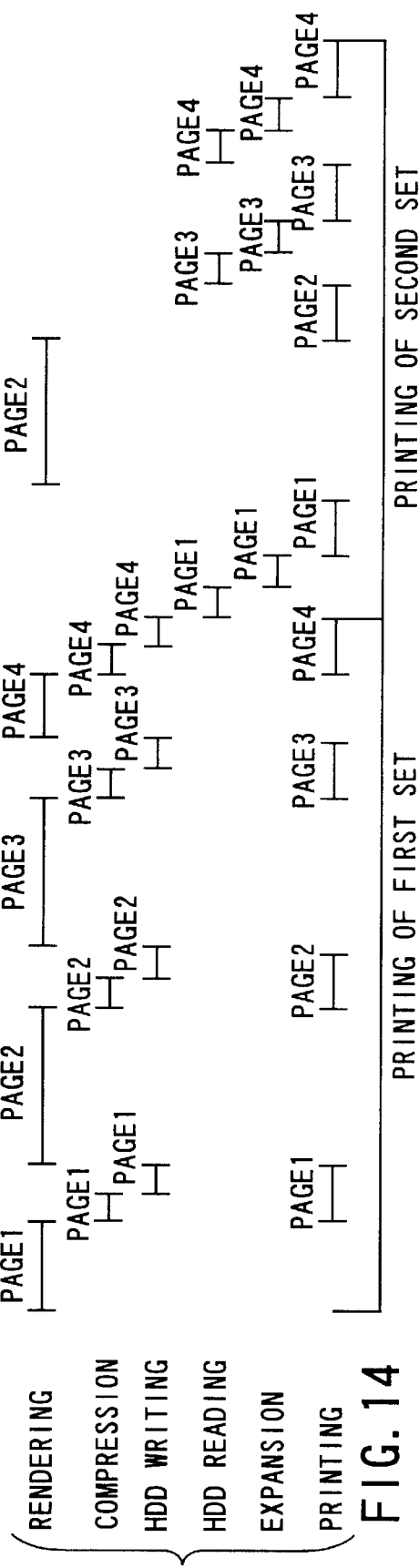

| PAGE | STORAGE INTO HDD | SECTOR No. | VOLUME | RENDERING TIME | DELETION OF OTHER DOCUMENTS |
|---|---|---|---|---|---|
| PAGE 1 | 1 | 200000 | 12MB | 30s | 0 |
| PAGE 2 | 1 | 212000 | 20MB | 150s | 0 |
| PAGE 3 | 1 | 25020 | 16MB | 100s | 1 |
| PAGE 4 | 1 | 232000 | 5MB | 10s | 0 |

IMAGE FORMING APPARATUS FOR EFFICIENTLY STORING DEVELOPED PRINT DATA DEPENDING ON SITUATIONS AND AN IMAGE FORMING METHOD THEREOF

BACKGROUND OF THE INVENTION

The present invention relates to a print control method in which code data such as PDL is converted into image data and printing is carried out.

Conventionally, when printing a document prepared by a personal computer (PC) or the like, a document prepared by an application program with use of a driver or library of the PC is converted into code data called a page description language (PDL) such as postscript or PCL. The code data is transferred to a printer through a network to perform printing. The printer comprises a printer controller and a printer engine. The printer controller interprets the code data to prepare a document image of a bit map. The printer engine receives the image data through a video I/F from the printer controller and performs printing onto a paper sheet. If the printer has a library for developing a file of an application program into an image, it is considered that printing can be achieved from an application file (in form of code data).

In recent years, networks have been developed and environments for network printers as described above have been almost prepared. However, it takes a long time to develop code data such as PDL into a bit map image, and besides, a sorting device or a finisher has not yet been sufficiently prepared. Therefore, a first set of a document is printed by a network printer and copies are prepared by a copying machine where a plurality of sets of copies are required.

In order to print a plurality of sets of a document, rendering processing for developing every page into an image is carried out, and image data after rendering is stored into a hard disk (HDD) directly or after compression. When printing a second or later set of the document, image data stored in the HDD or compressed data is expanded to perform a printing output without performing rendering. Since rendering is processing which takes a very long time, image data once prepared by rendering is thus stored into a HDD and is used for printing a plurality of sets of a document. The time required for rendering can be abbreviated and the processing speed can be improved. However, when the storage capacity of the HDD is full, image data itself cannot be stored and rendering must be carried out based on code data as for second and later sets of a document, resulting in a problem that printing cannot be performed at a higher speed.

As has been explained above, a conventional printer controller has a problem that no idea has not been made to improve the printing speed in consideration of the rendering time and the data amount of image data prepared by rendering.

BRIEF SUMMARY OF THE INVENTION

The present invention has an object of providing a print control method capable of printing a plurality of sets of one same document by efficiently storing image data after rendering in consideration of a rendering time and a data amount of image data prepared by rendering, and a printing apparatus using the print control method.

The present invention provides an image forming apparatus comprises preparing means for preparing print data for every page corresponding to inputted code data; storage means for storing the print data prepared by the preparing means; printing means for performing printing corresponding to the print data stored by the storage means when there is any print data stored by the storage means, and corresponding to the print data prepared by the preparing means when no print data is stored by the storage means; and controlling means for comparing a data amount of the print data with an empty capacity of the storage means, and for controlling the storage means so as to store the print data when the empty capacity is larger than the data amount, and for controlling the storage means so as not to store the print data and controlling each means such that the data amount is not compared with the empty capacity when the data amount is smaller than the empty amount.

As described above, the present invention provides an image forming apparatus in which print data subjected to rendering is stored into an empty area if an empty area exists in a storage area. For example, in case where a printer is connected to a personal computer and a plurality of sets each consisting of a document of a plurality of pages and the plurality of sets each consisting of a plurality of pages are to be printed in the structure as described above, image data subjected to rendering in printing of a first set of the document is not erased but is stored into a hard disk or the like. In this manner, the image data can be used for printing a second or later set of the document. In this arrangement, rendering processing which requires a long processing time can be omitted from the operation for printing the second and later sets of the document, so that the entire print processing time can be shortened. Further, it should be noted that image data is not stored evenly but image data is stored as much as possible. When it is determined that image data cannot be stored any more, any more image data is not stored. As for the second and later sets of the document, image data which can be used and which has been stored is used, and those pages whose image data has not been stored are subjected to rendering processing for every page.

According to another embodiment of the present invention, the determination as to whether or not image data should be stored is made in various ways. In association with fine storage processing and data deletion processing matched with the situation, rendering processing and storage processing of image data can be performed under an optimal condition. As a result, the present invention does not use evenly image data but performs optimal processing, depending upon circumstances, unlike a conventional apparatus. It is therefore possible to provide an image forming apparatus which realizes rapid print processing with the highest efficiency, and an image processing method using the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 6 is a view showing an example of storage of data in the hard disk (HDD) shown in FIG. 1;

FIG. 7 is a table showing an example of management information stored in the hard disk (HDD) shown in FIG. 1;

FIG. 8 is a table showing an example of management information prepared on the memory shown in FIG. 1;

FIG. 12 is a view showing an example of timings of rendering, compression, expansion, HDD writing, HDD reading, and print operation, corresponding to FIG. 11;

FIG. 14 is a view showing an example of timings of rendering, compression, expansion, HDD writing, HDD reading, and print operation, corresponding to FIG. 13;

DETAILED DESCRIPTION OF THE INVENTION

In the following, embodiments of the present invention will be explained with reference to the drawings.

Figures 1, 3:
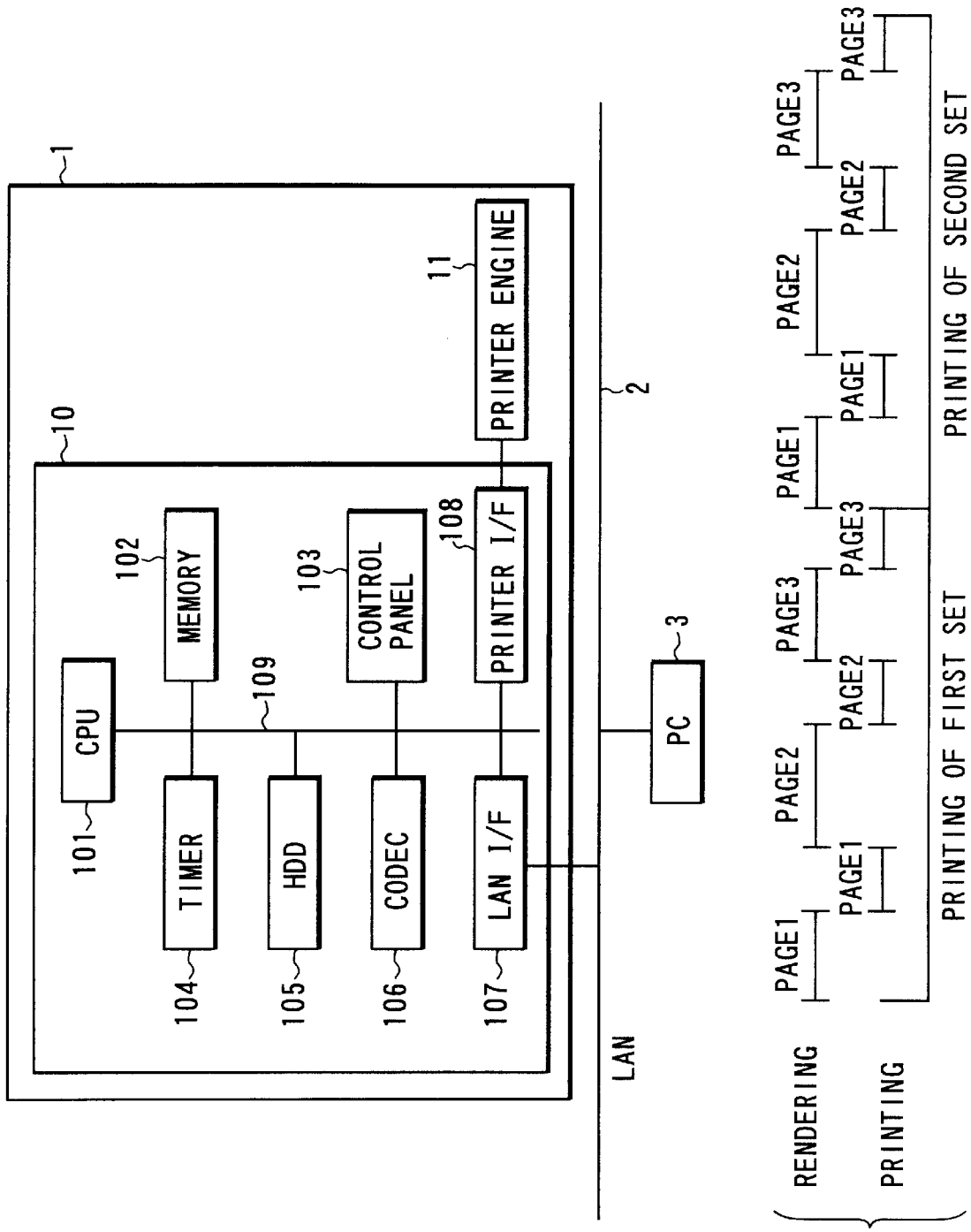
FIG. 1 is a view showing a structure example of a printing apparatus according to an embodiment of the present invention.
FIG. 3 is a view showing an example of timings of rendering and print operation, corresponding to FIG. 2.

FIG. 1 shows a structure example of a printer (printing apparatus) according to the present embodiment. The printer 1 is connected to a personal computer (PC) 3 as a client terminal, for example, through a LAN (local area network) 2. A plurality of client terminals may be used.

The printer 1 is roughly divided into two components one of which is a printer controller (or print control device) 10 and a printer engine 11. The printer controller receives print document code data from the PC 3 and develops the data into image data in form of a bit map, and the printer engine 11 is connected to the printer controller 10 through a printer interface (I/F) 108 and prints the image data onto a paper sheet when the image data is transferred from the printer controller 10 in synchronism with the printing speed.

The printer controller 10 comprises a CPU 101, a memory 102, a HDD 105, a timer 104, a control panel 103, a CODEC 106, a LAN interface (I/F) 107, and a printer I/F 108. The CPU 101 interprets code data transferred from the PC 3 to prepares image data, and performs total control of the printer such as control of the LAN 2 and the printer engine 11. The memory 102 temporarily stores a program for performing rendering processing and developed image data. The HDD 105 stores a large amount of data such as code data of a document, image data developed into a bit map, compressed data obtained by compressing image data, data management information, and the like. The timer 104 measures time. The control panel 103 displays an error and performs operation. The CODEC 106 prepares compressed data from image data prepared in a page memory area of the memory 102, so that the compressed data is stored into the HDD 105 or the memory 102, or inversely expand compressed data so that the compressed data is converted into image data. The LAN interface (I/F) 107 connects the PC3 with the LAN 2. The printer I/F 108 is used to connect the printer engine 11. The CPU 101, memory 102, control panel 103, timer 104, HDD 105, CODEC 106, LAN I/F 107, and the printer I/F 108 are connected through an internal bus 109.

Next, explanation of basic operation of the printer controller will be made below prior to explanation of operation of the printer according to an embodiment of the present invention. Specifically, explanation will be made to operation in which printing is performed on a plurality of sets of sheets in both of the cases where the HDD 105 is not used and where the HDD 105 is used.

Figure 2:
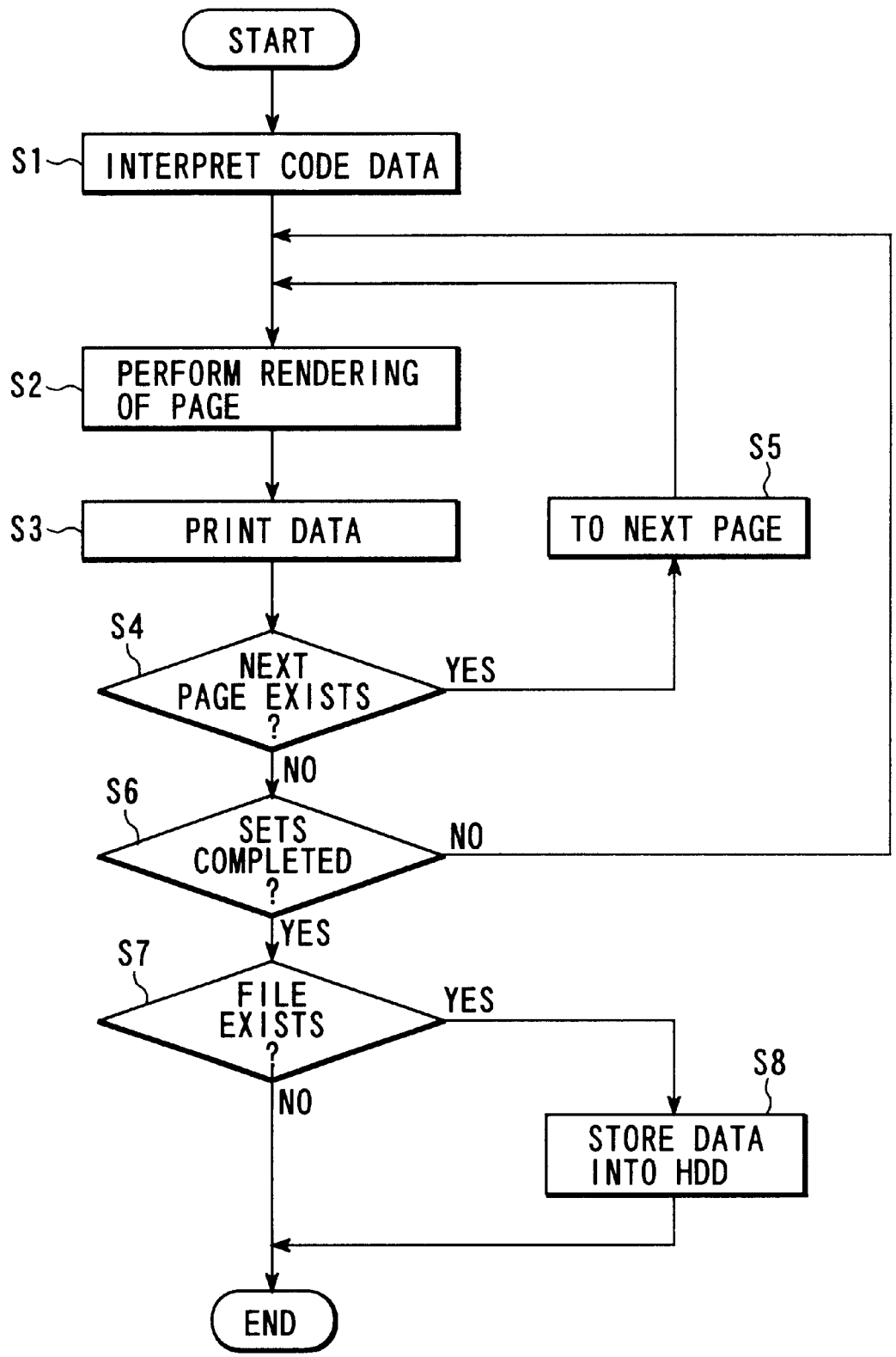
FIG. 2 is a flowchart for explaining basic operation of a printer controller (where no HDD is used)

Firstly, explanation will be made of operation for performing a plurality of sets of sheets without using the HDD 105 with reference to a flowchart shown in FIG. 2 and a timing chart shown in FIG. 3.

In the PC 3, a document which requires printing is prepared on an application. By specifying printing in the application, a driver or a library of the PC 3 converts a document file into code data such as PDL or the like and transfers code data to the printer 1 through the LAN 2 by communication. The code data include the number of pages constituting a document and the number of sets of sheets to be printed in addition to document code data obtained by encoding a document image.

Code data transferred through the LAN 2 is received by the LAN I/F 107 and is stored into the memory 102 through the bus 109. The code data stored in the memory 102 is read out by the CPU 101, and rendering of the first page is carried out while interpreting document code data after the size and the number of paper sheets, and the number of sets of paper sheets are confirmed (steps S1 to S2). Rendering is an operation of preparing image data in form of a bit map for forming an image on a paper sheet. The image data thus prepared is stored into a page memory area in the memory 102.

Upon completion of rendering of the first page, operation of the printer engine 11 is started through the printer I/F 108 and a paper sheet is supplied. Thereafter, image data is read out from the memory 102, is transferred to the printer engine 1 through the printer I/F 108, and is printed onto a paper sheet (Step S3).

In the manner described above, printing of the first page is completed. Printing of a second page is carried out by interpreting document code data by the CPU 101 like in the case of the first page, to form image data in the memory 102. In this time, if the memory area in the memory 102 has only a memory capacity for one page, image data is prepared by clearing or overwriting one same memory are. By repeating this operation for an antilogarithm number of sheets of a document, printing of a first set of document is completed (steps S4 to S5 and steps S2 to S4).

Printing operation for second and later sets of document is carried out by repeating printing of the first set of document described above. That is, as shown in the flowchart in FIG. 2 and the timing chart in FIG. 3, rendering and printing are repeated for every one of pages.

Next, printing of a plurality of sets of document using the HDD 15 will be explained with reference to the timing chart shown in the flowchart shown in FIG. 4 and the timing chart shown in FIG. 5.

Firstly, a document requiring printing is prepared on an application in the PC 3. By specifying printing in the application, a driver or a library of the PC 3 converts the document file into code data such as PDL and transfers the code data to the printer 1 through the LAN 2.

The code data transferred to the LAN 2 is received by the LAN I/F 107 and is stored into the memory 102. The code data stored into the memory 102 is read out by the CPU 101, and rendering of the first page is performed while interpreting document code data after the sheet size, the algorithm number, and the number of sets are confirmed (steps S11 to S13). Image data thus prepared is stored into the page memory area in the memory 102.

Upon completion of rendering of the first page, operation of the printer engine 11 is started through the printer I/F 108 and a paper sheet is supplied. Thereafter, image data is read out from the memory 102 and is transferred to the printer engine 11 through the printer I/F 108. Printing on the paper sheet is then carried out (step S14). Simultaneously, image data is read out from the memory 102 and is inputted into the CODEC 106, so that the image data is compressed (step S15). Note that the compression system in the CODEC 106 may be a LZ system, MH system, or MMR system as a loss-less system. Compression is carried out so as not to waste the capacity of the HDD 105 as much as possible and to increase the data transfer speed of the HDD 105 as high as possible. Compression needs not always be carried out.

The data compressed by the CODEC 106 is once stored into the work area of the memory 102, and is thereafter stored into the HDD 105 (step S16).

Next, as for printing of a second page, document code data is interpreted by the CPU 101 in a similar manner and image data is formed in the memory 102. In this time, if the page memory area of the memory 102 has only a memory capacity equivalent to one page, image data is prepared by clearing or overwriting one same memory area after printing of the first page. The operation described above is repeatedly carried out for the number of pages constituting a document, thus completing printing of a first set of document (steps S17 to S18 and steps S13 to S17).

As for a second set of document (step S19), compressed data of the first page is read out from the HDD 105 and is temporarily stored into the memory 102 (step 20). The compressed data is read out from the memory 102 and is transferred to the CODEC 106 and is then subjected to expansion processing, to prepare original image data which is stored into the page memory area of the memory 102 (step S21). The image data is read out from the memory 102 and is transferred to the printer engine 11 through the printer I/F 108, thus completing printing of the first page of the second set of document (step S22).

Likewise, compressed data of the second page and later pages is read out from the HDD 105, and printing is repeatedly carried out by the printer engine 11 after explanation of the data. Printing of the second set of document is thus completed (steps S23 to S24 and steps S20 to S22).

As for the third and later sets of document, printing is carried out in the same manner as in case of the second set.

If a printing instruction from the PC 3 instructs only printing and does not instructs filing of compressed data and code data, a memory space for the case where printing is instructed next can be maintained by erasing compressed data stored in the HDD 105 for printing of the second and later sets after completion of printing.

Figure 4:
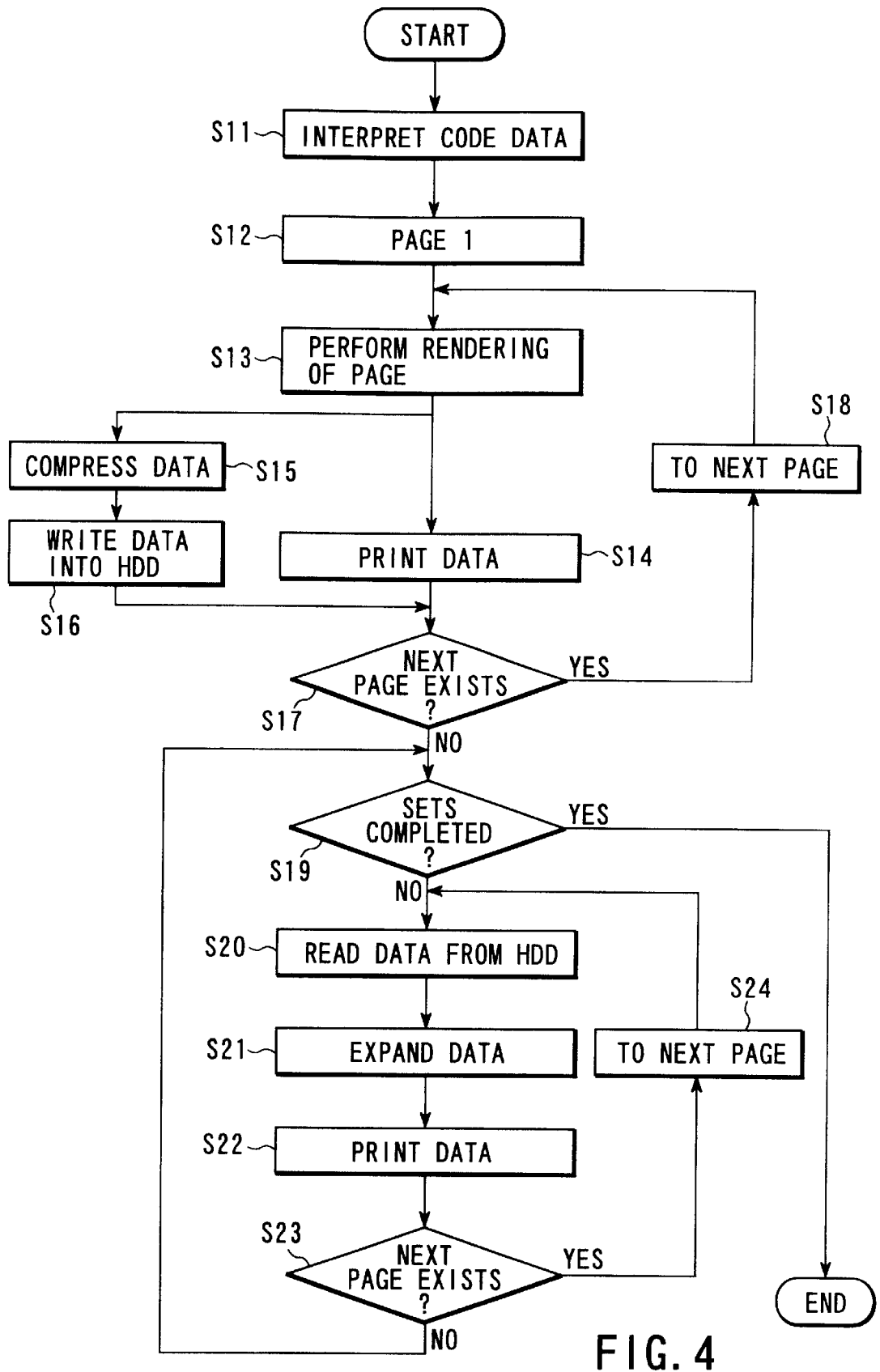
FIG. 4 is a flowchart for explaining basic operation of a printer controller (where a HDD is used)
Figure 5:
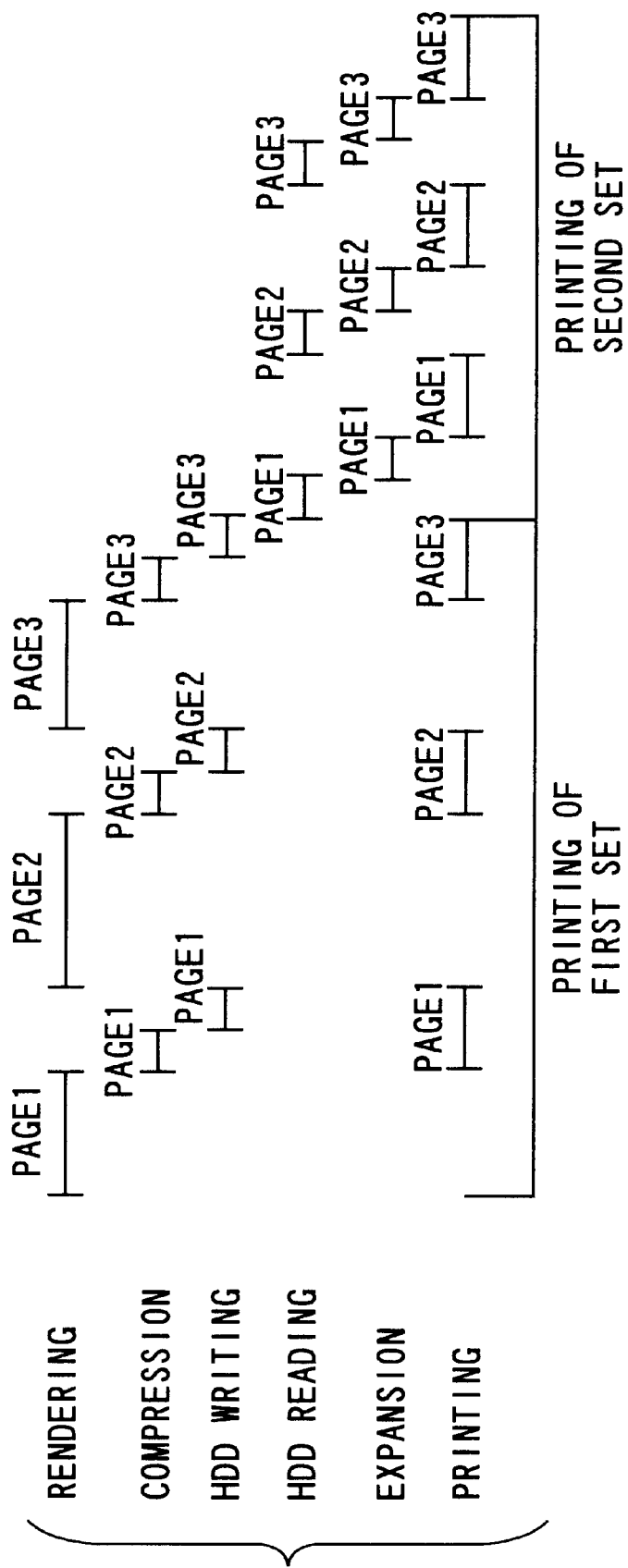
FIG. 5 is a view showing an example of timings of rendering and print operation, corresponding to FIG. 4.

In case of printing a plurality of sets of document, as is apparent from comparison between FIGS. 3 and 5, the time required for rendering can be more shorted and the second and later sets of document can be printed at a higher speed in the case (shown in FIG. 5) where image data rendered is stored into a memory device such as a HDD 105 when printing a first set of document and image data of each page is read out from the HDD 105 and expanded upon necessity and printed, as shown in FIG. 4, compared with the case (shown in FIG. 3) where code data of each page is rendered every time one set of document is printed.

In the following, explanation will be made of print control operation of a printer controller according to an embodiment of the present invention.

FIG. 6 shows an example of stored data. Program data is of a program used by the printer controller 10, font data is various character data used for developing code data into image data. Document information stores compressed data obtained by compressing image data, or code data, so that rendered image data can be stored and printing can be performed in accordance with a request from the PC 3 without rendering.

As shown in FIG. 6, there are two types of documents one of which is a type of document (such as a document 1 or 2) which stores code data as original data together with compressed data, and the other of which is a type of document (such as a document 3) which does not store code data. Although the code data can be divided into units of pages, the code data is stored in units of documents in the present embodiment.

Management information is used to manage document data stored in the HDD 105 and has a structure shown in FIG. 7. The management information consists of a document name, presence or absence of code data, presence or absence of compressed data, pages, a sector number in the HDD, a data capacity, and a rendering time.

From FIG. 7, it is known that the document 1 is a document which consists of 4 pages and stores code data and compressed data. Code data is stored at a sector number 10,000 with a volume of 20 KB. Also, from the figure, it is known that the first page is stored at a sector number 10020 with a volume of 15 MB and 180 seconds are required for rendering. The document 3 does not include code data but only compressed data thereof is stored. The document 4 does not include compressed data but only code data thereof is stored. The document 4 does not include compressed data but only code data thereof is stored. The document data is data managed by the printer controller 10, and printing is enabled without transferring code data from the PC 3.

The storing state of the HDD 105 (in the first embodiment) is as shown in FIG. 7. Operation of the printer 1 shown in FIG. 1 in case of printing two sets of the document 2 will be explained with reference to the flowchart shown in FIG. 9. Note that the document 5 includes four pages.

At first, code data of the document 5 is transferred to the LAN I/F 107 of the printer controller 10 through the LAN 2 from the PC 3, and the LAN I/F 107 stores the received code data of the document 5 into a work area of the memory 102. Next, the CPU 101 interprets the code data on the memory 102 and recognizes that two sets each consisting of a document of four pages are to be printed. Then, the CPU 101 goes into rendering processing of code data (steps S101 to S102).

Firstly, to perform rendering of the first page of the document 5, the timer 104 is started and simultaneously code data is interpreted to prepare image data in the page memory are of the memory 102. Upon completion of rendering, the timer 104 is stopped and the rendering time is stored.

To print prepared image data, the CPU 101 instructs the printer engine 11 to make preparation for printing through the printer I/F 108. Next, image data of the first page of the document 5 is transferred to the printer engine 11 through the printer I/F 108 thereby to complete printing (step S107).

At the same time when the print processing is carried out, the CPU 101 checks whether or not a storage area (or empty area) for data exists in the HDD 105. If there is a storage area, image data of the first page of the document 5 is read out from the memory 102 and is transferred to the CODEC 106. Thereafter, compressed data is stored into the memory 102. In this time, the data capacity of the compressed data is confirmed. If there is an empty capacity equivalent to the compressed data, the compressed data of the first page is stored into the HDD 105 (steps S105 to S106).

Upon completion of the operation described above, code data of the second page of the document 5 is interpreted and image data is prepared. Printing by the printer engine 11 and storage into the HDD 105 are repeated (steps S108 to S109 and steps S103 to S108).

In the printing operation of the first set of document presently being printed, the CPU 101 prepares management information as shown in FIG. 8 on the memory 102 to manage the condition of the data of pages to be printed. From FIG. 8, it is known that the first and second pages of the document 5 are compressed and stored in the HDD 105 but compressed data of the third and fourth pages of the document 5 is not stored in the HDD 105. In case of printing second and later sets of the document, rendering processing needs to be performed from code data. If compressed data is stored in the HDD 105, the sector number of the HDD 105 at which the compressed data is stored and the data amount of the compressed data, the rendering time measured by the timer 104 is stored as shown in FIG. 8.

Based on the management information on the memory 102 as shown in FIG. 8, printing of second and later sets of the document is carried out.

Next, consideration will be taken into a case that the HDD includes no empty capacity and the compressed image data cannot be stored (step S105), when code data of the third page of the document 5 is interpreted, developed into image data, and printed, and when the code data is simultaneously compressed by the CODEC 106. For example, the empty capacity of the HDD 105 at the time is 37 MB when printing of the document 5. However, the storage capacity is apparently insufficient since it is known from the management information shown in FIG. 8 that the compressed data of the first page of the document 5 is 12 MB, the compressed data of the second page of the document 5 is 20 MB, and further, the compressed data of the third page of the document 5 is 16 MB.

If it is determined in the step S105 that the HDD 105 does not have a capacity enough to store the compressed data of the third page of the document 5, writing into the HDD 105 is not carried out any more but the operation goes to the step S110. After printing, data temporarily stored in the memory 102 is not stored into the HDD 105 but is erased directly. Code data of the next fourth page of the document 5 is subjected to rendering to prepare image data on the memory 102. Image data is transferred to the printer engine 11 through the printer I/F 108, and printing is than carried out. In this time, since the compressed data of the third page of the document 5 could not be stored, image data of the fourth page of the document 5 is not compressed by the CODEC 106 but printing of the image data of the fourth page of the document 5 is completed. Printing of the first set of the document 5 is thereby completed (steps S110 to S113).

Next, the operation goes to printing of the second set of the document. As for the second set of the document, data of the first and second pages of the document 5 is stored in the HDD 105, as image data whose rendering has been completed (step S115). Therefore, the CPU 101 firstly reads out compressed. data of the first page of the document 5 from the HDD 105, and the compressed data of the first page is once stored into the memory 102. The compressed data is transferred to the CODEC 106 and is expanded. Thereafter, image data is stored into the page memory area in the memory 102 (steps S116 to S117). The image data is read out from the memory 102 and is transferred to the printer engine 11. Thus, printing of the image data of the first page of the document 5 is carried out (step S119).

As for the second page of the document 5 (steps S120 to S121), since compressed data is stored in the HDD 105 like the first page of the document 5, the same processing as described above is carried out to perform printing (steps S115 to S119).

As for the third and fourth pages of the document 5, since compressed data thereof could not be stored into the HDD 105, rendering from the code data stored in the memory 102 is carried out like in the case of the first set and printing thereof is then carried out (steps S115, S118, and S119). In this manner, two sets of the printed document 5 are obtained.

Figure 10:
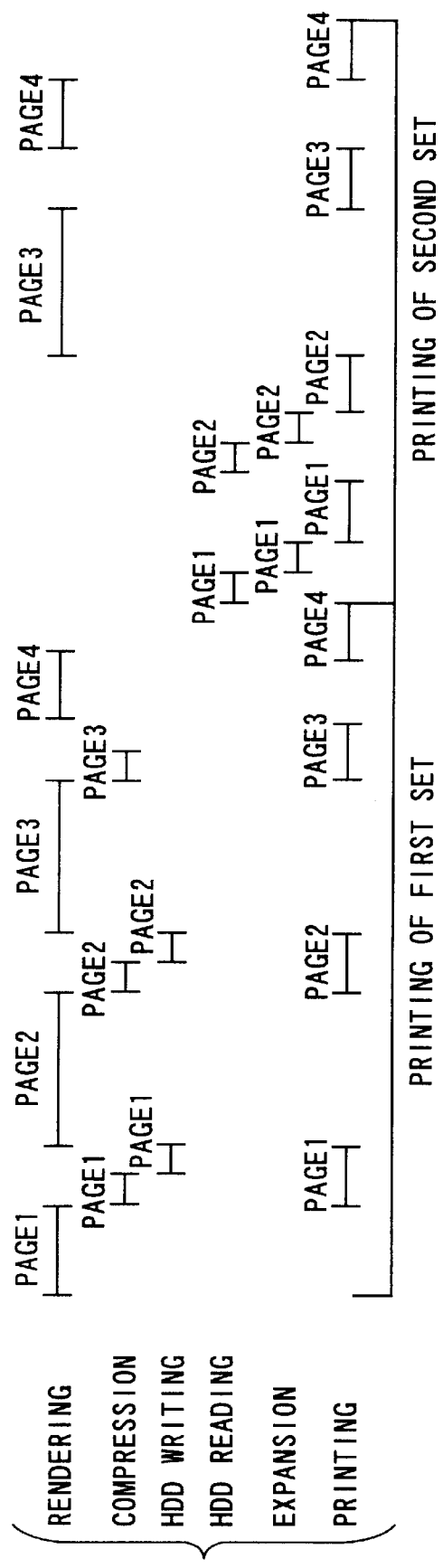
FIG. 10 is a view showing timings of rendering, compression, expansion, HDD writing, HDD reading, and print operation corresponding to FIG. 9.

As is apparent from the timing chart shown in FIG. 10, rendering processing is not carried out with respect to the first and second pages of the document 5 in the printing operation for the second set of the document. Therefore, printing of the second and later sets of the document is carried out at a higher speed.

As described above, according to the first embodiment, image data (or compressed data) of a certain page obtained by rendering code data is stored into the HDD 105. In this time, whether or not the volume of the compressed data of the image data is smaller than the remaining capacity of the storage area of the HDD 105 is determined. If there remains a sufficiently large capacity, the compressed data is stored and is used for printing the second set of the document. If there remains no enough empty capacity, compressed data of image data of the certain page and the later pages is not stored. In this manner, rendering processing which requires a long processing time can be abbreviated as for the second and later sets of the document, so that the entire print processing time can be shortened. That is, in the present embodiment, image data is not uniformly stored but the amount of the image data that can be stored is stored. If it determined that the image data cannot be stored, the other amount of the image data is not stored. As for the second and later sets of the document, usable image data which has once been stored is used and rendering processing is carried out as for every of the pages not stored.

In this manner, image data can be used in an optimal situation.

(Second Embodiment)

Figure 11:
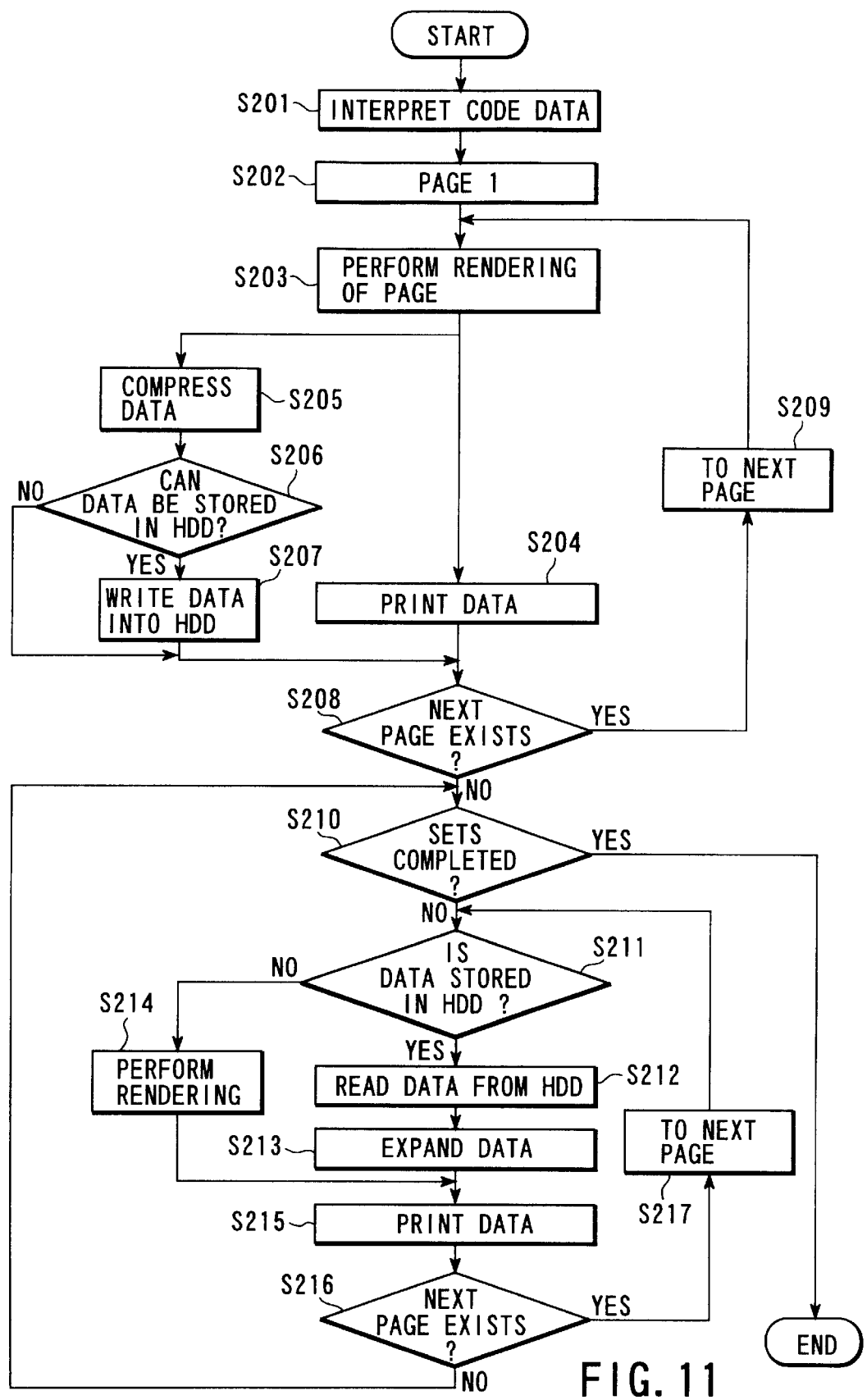
FIG. 11 is a flowchart for explaining a second embodiment.

A second embodiment of the present invention will be explained with reference to the flowchart shown in FIG. 11. Note that the explanation will be made of a portion which differs from the print control operation of the first embodiment.

Like the above explanation of the first embodiment, the HDD 105 has no empty capacity and image data cannot be stored when image data of the third page of the document 5 is compressed by the CODEC 106 and compressed data is stored into the HDD 105. In this situation, image data of the third page of the document 5 is completely transferred to the printer engine 11, and then, image data of the third page of the document 5 on the memory 102 is erased. Code data of the next fourth page of the document 5 is rendered thereby to prepare image data on the memory 102, and image data is transferred to the printer engine 11 through. the printer I/F 108. Printing is thus carried out (steps S203 to S204).

In the second embodiment, at the same time, image data of the fourth page is compressed by the CODEC 106 (step S205), and the compressed data is once stored into the memory 102. Whether or not the image data can be stored into the HDD 105 is confirmed (step S206).

The compressed image data of the fourth page of the document 5 is as small as 5 MB as is apparent from the management information shown in FIG. 8 and can be stored into the HDD 105. In this case, compressed data is read out from the memory 102 and is written into the HDD 105 (step S207).

Upon completion of printing of image data of the fourth page of the document 5, printing of the first set of the document 5 is completed.

Figure 9:
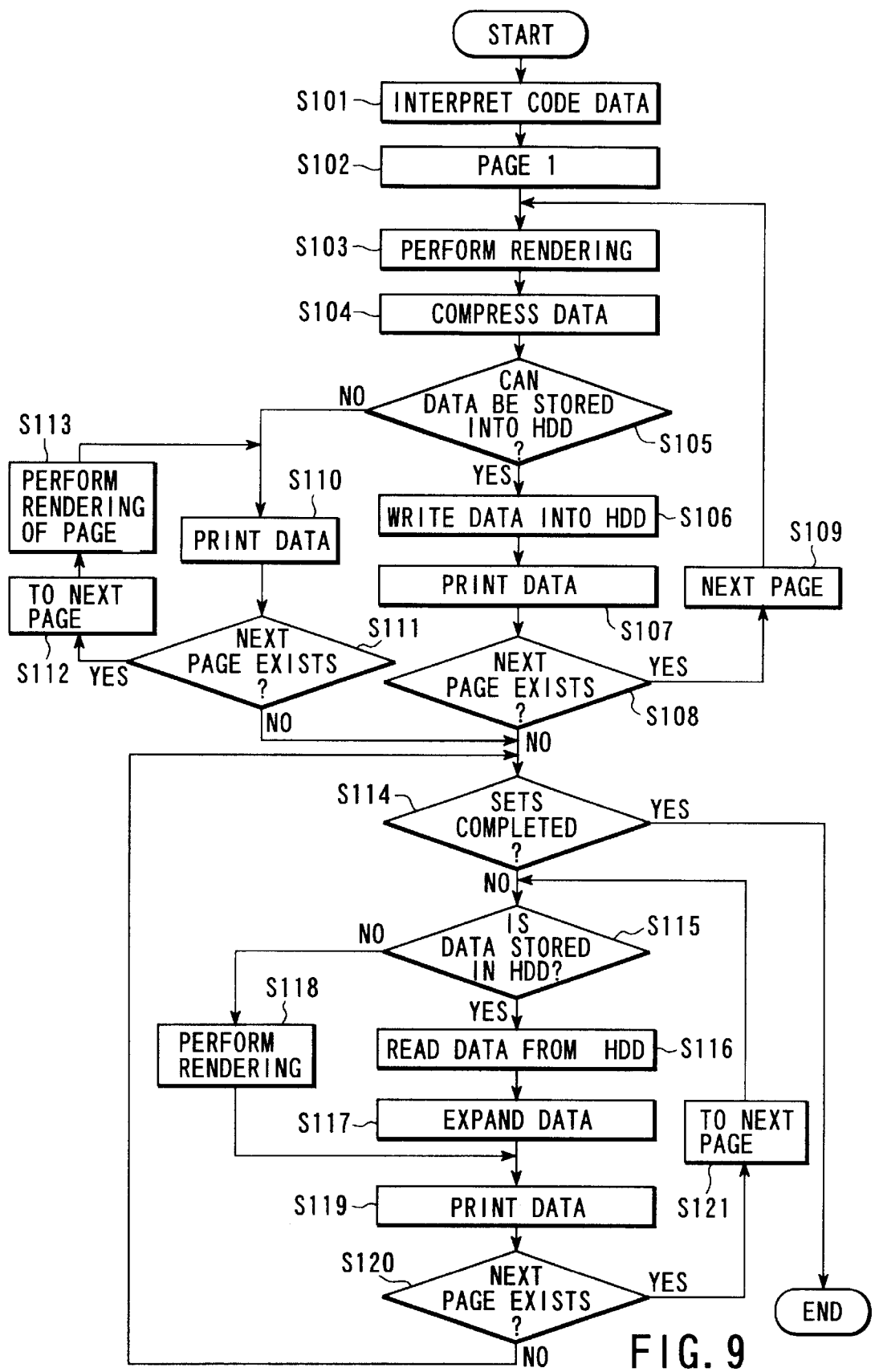
FIG. 9 is a flowchart for explaining a first embodiment according to the present embodiment.

The processes on steps 210 to 217 is the same contents as the processes on the steps 114 to 120 in FIG. 9, so the explanation is omitted.

As is apparent from the timing chart shown in FIG. 12, in the printing operation of the second, rendering processing is not carried out with respect to the first, second, and fourth pages of the document 5, and therefore, second and later sets of the document 5 can be printed at a higher speed.

As described above, according to the second embodiment, image data (or compressed data) of a certain page obtained by rendering code data is stored into the HDD 105 in the printing operation for the first set of a document. In this time, whether or not the volume of the compressed data of the image data is smaller than the remaining capacity of the storage area of the HDD 105 is determined. If there remains a sufficiently large capacity, the compressed data is stored and is used for printing the second set of the document. If there remains no enough empty capacity, the compressed data of the image data of the certain page and the later pages is not stored.

However, the second embodiment is different from the first embodiment in that the volume of compressed data of every page is subsequently compared with the empty capacity of the HDD 105. That is, the volume of the compressed data of image data varies depending on the configuration of pages. If any later page requires only a small volume, the compressed data of the image data of such a page can be stored. In the print processing operation according to the second embodiment, such fine comparison processing is carried out for every page, and thus, optimal recycle use of image data can be realized so that the speed of the print operation can be improved.

(Third Embodiment)

Figure 13:
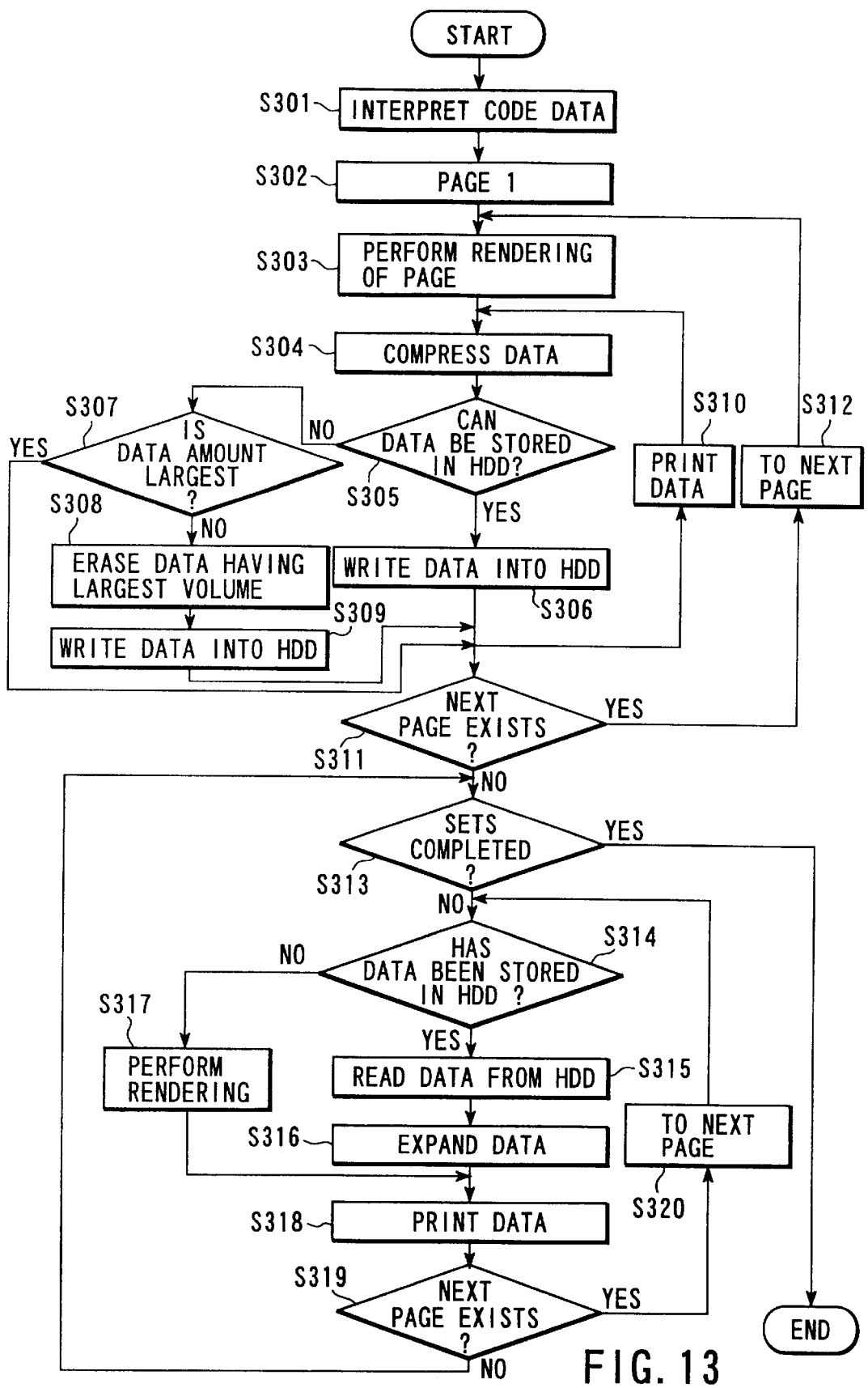
FIG. 13 is a flowchart for explaining a third embodiment.

A third embodiment of the present invention will be explained with reference to the flowchart shown in FIG. 13. Note that explanation will be made of a portion which differs from the first embodiment.

Like the first embodiment described above, the HDD 105 has no empty capacity and image data cannot be stored when image data of the third page of the document 5 is compressed by the CODEC 106 and the compressed data is to be stored into the HDD 105. In this situation (step S305), the image data of the third page of the document 5 is transferred to the printer engine 11 and then printed (step S310).

According to the third embodiment, at the same time, the data amount of the compressed data of the first and second pages already stored in the HDD 105 is compared with the data amount of the compressed data of the third page (step S307).

As indicated by the management information shown in FIG. 8, the compressed data of the third page of the document 5 is 16 MB and is thus smaller than the compressed data of the second page. Therefore, the compressed data of the second page of the document 5 is erased from the HDD 105 (step S308), and the compressed data of the third page of the document 5 is stored into the HDD 105 in place of the erased data (step S309).

Next, rendering of the code data of the fourth page is carried out to prepare image data on the memory 102. The image data is transferred to the printer engine 11 through the printer I/F 108 and printing is carried out (steps S311, S312, and S310). At the same time, compression is performed by the CODEC 106 (step S304), the compressed data is once stored into the memory 102, and whether or not the compressed data can be stored into the HDD 105 is confirmed (step S306). In this manner, printing of the image data of the fourth page is completed and printing of the first set of the document 5 is terminated.

The processes on the steps 313 to 320 is the same contents on the steps 114 to 120 in FIG. 9, so the explanation is omitted.

For example, according to the first embodiment, since only the compressed image data of the first and second pages of the document 5 could be stored into the HDD 105, rendering processing for the two pages needs to be carried out in the print operation for the second and later sets of a document. In contrast according to the third embodiment, since compressed image data of the first, third, and fourth pages could be stored into the HDD 105 as is apparent from FIG. 14, rendering processing of the second page needs to be carried out in the print operation for the second and later sets of the document. Therefore, print operation of the second and later sets of the document is carried out at a higher speed.

In addition, the HDD 105 has only an empty capacity of 37 MB when printing of the document 5 is started. In this time, according to the second embodiment, compressed image data of the second page and that of the third page are stored into the HDD 105 without replacing these two pieces of data, and therefore, compressed image data of the first, second and fourth pages is added together to create total 37 MB. However, in the print operation according to the third embodiment, compressed image data of the first, third, and fourth pages which create total 37 MB is stored into the HDD 105 by replacing the compressed image data of the second page and that of the third page. Further, 4 MB of empty capacity remains in the HDD 105. If the document 5 has a fifth page and the compressed image data of the fifth page is 4 MB or less, the image data of the fifth page can be stored into the HDD 105, and therefore, rendering processing is not required for the fifth page when printing the second and later sets. Therefore, the print operation of the second and later sets can be carried out at a higher speed.

As described above, according to the third embodiment, if the HDD 105 does not have an empty capacity enough to store the image data (or compressed data) of each page, efficient storing of image data is realized by deleting only the image data having the maximum data amount, unlike the print control operation according to the first and second embodiments. That is, whether or not there is an empty capacity equivalent to the data amount of the compressed data is checked for every page when the image data (or compressed data) of each page obtained by rendering code data is stored into the HDD 105 in the print operation of the first set. If there is no empty capacity equivalent to the data amount of the compressed data of a certain page, when there is compressed image data whose data amount is the largest among pieces of compressed image data of respective pages of the document already stored in the HDD 105, including pages whose compressed image data is to be stored thereafter. The compressed image data having the largest data amount is erased and the compressed data of the certain page is stored into the HDD 105.

In several cases, the volume of image data may greatly differs depending on pages. Therefore, for example, pieces of data of three pages having smaller capacities can be stored by deleting the data having the largest amount, and the total print processing time can be shortened.

(Fourth Embodiment)

Figure 15:
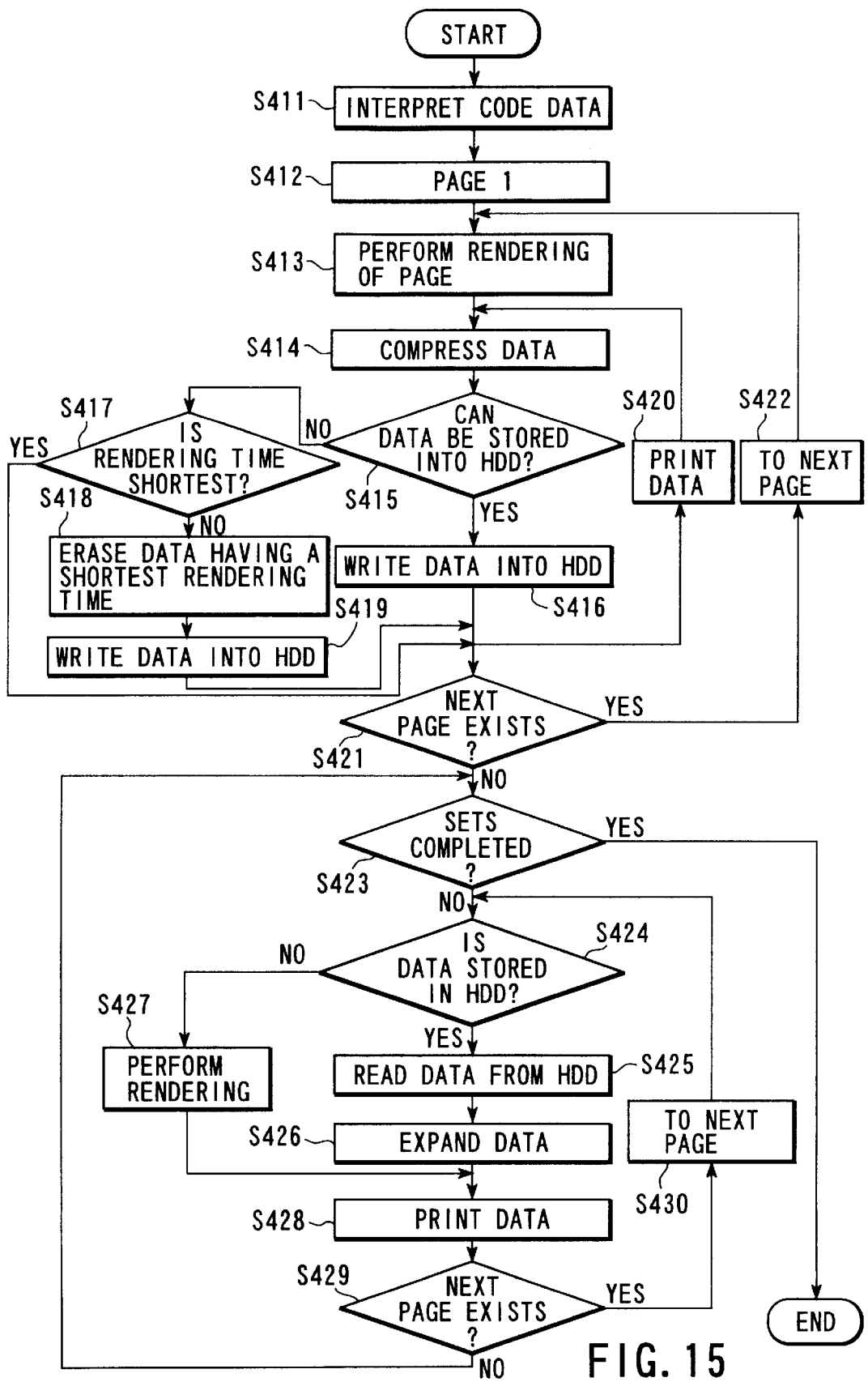
FIG. 15 is a flowchart for explaining a fourth embodiment.

A fourth embodiment of the present invention will be explained with reference to the flowchart shown in FIG. 15. Note that explanation will be made of a portion different from the first embodiment.

In the fourth embodiment, the timer 104 is started at the same time when rendering processing of every page is started and the time is measured when the rendering processing is terminated.

Like the first embodiment described above, the image data of the third page of the document 5 is transferred to the printer engine 11 and then printed (step S420), in a situation (step S415) that the HDD 105 has no empty capacity and image data cannot be stored when image data of the third page of the document 5 is compressed by the CODEC 106 and the compressed data is to be stored into the HDD 105.

In the fourth embodiment, at the same time, the rendering times of the first and second pages of the document 5 already stored in the HDD 105 are compared with the rendering time of the third page of the document 5, with reference to the management information shown in FIG. 8 (step S417).

As indicated in the management information in FIG. 8, the rendering time of the third page is 100 seconds and is longer than the rendering time of 30 seconds of the first page but is shorter than the rendering time of 150 seconds of the second page. In addition, the compressed data 16 MB of the third page cannot stored into the empty capacity 5 MB of the HDD 105 at present. However, the compressed data 16 MB of the third page can be stored if the compressed data 12 MB of the first page is deleted. Therefore, the compressed data of the first page of the document 5 is deleted from the HDD 105 (step S418), and the compressed data of the third page is stored into the HDD 105 (step S419).

The processes on the steps 423 to 430 is the same contents as the processes on the steps 114 to 120 in FIG. 9, so the explanation is omitted.

For example, according to the first embodiment, since only the compressed image data of the first and second pages of the document 5 can be stored into the HDD 105, rendering processing of the two pages must be carried out in the print operation of the second and later sets of the document. That is, according to the first embodiment, rendering of the third page takes 100 seconds and rendering of the fourth page takes 10 seconds, i.e., a rendering time of total 110 seconds is taken for the third and fourth pages in the print operation of the second or later set of the document. In contrast, according to the fourth embodiment, as is apparent from the timing chart shown in FIG. 16, rendering of the first page takes 30 seconds and rendering of the fourth page takes 10 seconds, i.e., only a rendering time of total 40 seconds is required so that the print operation of the second and later set of a document can be performed at a high speed.

As described above, according to the fourth embodiment, if the HDD 105 does not have an empty capacity enough to store image data (or compressed data) of each page, image data of another page is stored by deleting the image data which takes the shortest rendering time. This is based on an intention that extension of the entire processing time can be reduced to be shortest as far as the rendering time is the shortest even if rendering must be performed for every page without storing an image.

Specifically, in the print operation of the first set, whether or not an empty capacity equivalent to the data amount of the compressed data of a certain page remains in the HDD 105 is checked for every page, when image data (or compressed data) of each page obtained by rendering code data is stored into the HDD 105. If there is no empty capacity equivalent to the data amount of the compressed data of the certain page, and if there is compressed image data of a page having the shortest rendering time among pieces of compressed image data of pages of one same document which have already been stored, including pieces of compressed image data of pages to be stored later. The compressed image data having the shortest rendering time is erased and the image data of the page is stored into the HDD 105. In this manner, in the print operation of the second and later pages, the print operation of the pages whose image data has been stored in the HDD 105 requires no rendering processing, and even if any of the pages requires rendering, the processing times of all such pages are short, so that the print operation can be performed at a higher speed.

(Fifth Embodiment)

The pieces of image data (which may be compressed) after being subjected to rendering, which have been printed before, may be stored upon request from the PC 3. Since rendering requires a certain processing time, it may take a certain time even if printing should be soon started. Therefore, the image data of a document which is used very frequently, after rendering, is not erased but is kept stored in the HDD 105 after completion of the print operation. Further, the image data may be directly printed by simply instructing a document to a printer (upon necessity). The speed of the print operation can be improved, compared with a case in which code data is transmitted from the PC 3 every time printing is required.

Note that image data whose rendering has been completed or data obtained by compressing image data as well as code data may be stored into the HDD 105. In this case, the image data can be reproduced by rendering processing since code data is stored in the HDD 105 even if image data is erased due to any processing.

Figure 18:
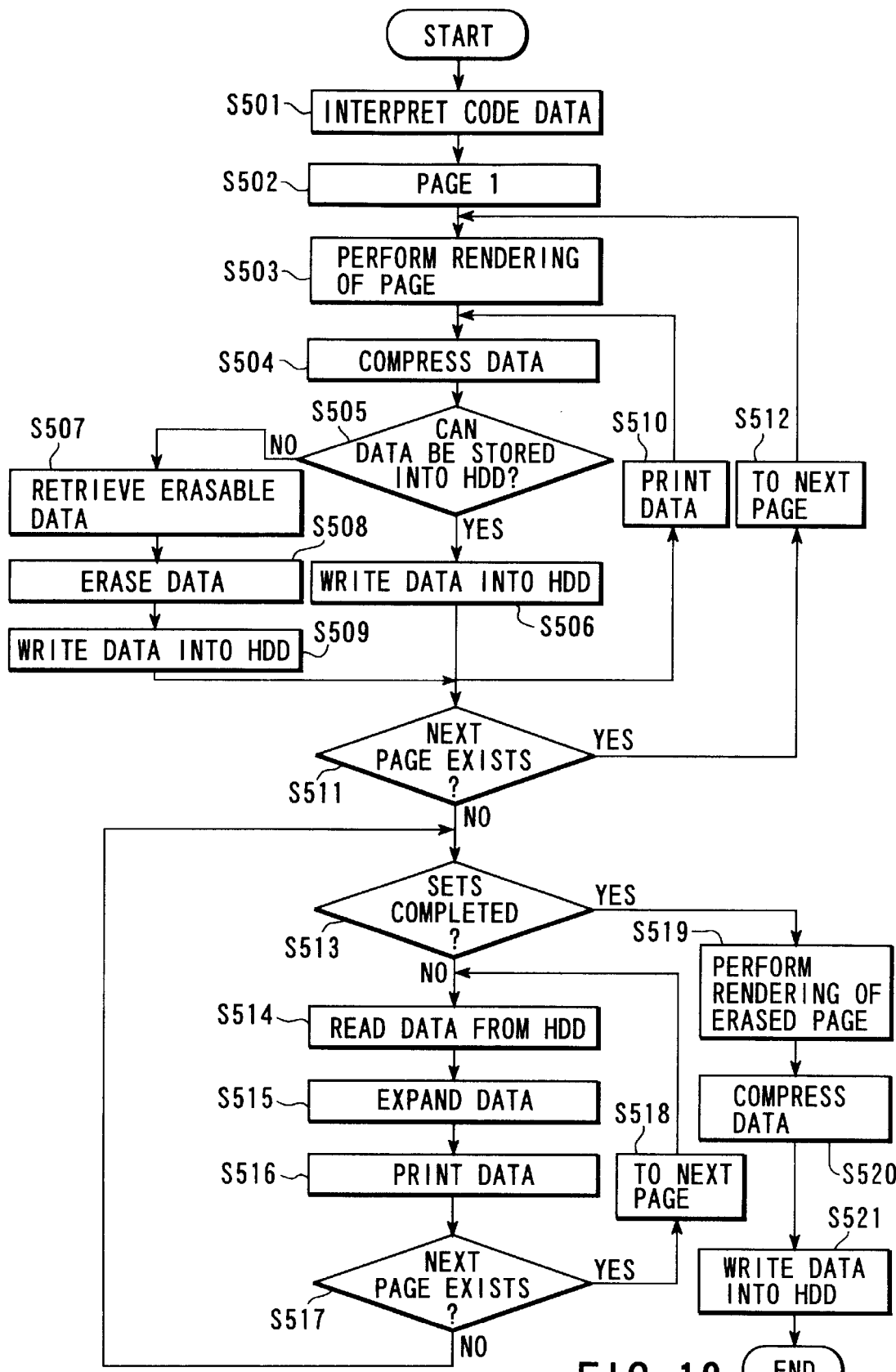
FIG. 18 is a flowchart for explaining a fifth embodiment according to the fifth embodiment.

Under this situation, the fifth embodiment will be explained with reference to the flowchart shown in FIG. 18. Note that a portion different from the first embodiment will be explained below.

Like the first embodiment described above, the image data of the third page of the document 5 is transferred to the printer engine 11 and then printed (step S510), in a situation (step S505) that the HDD 105 has no empty capacity and image data cannot be stored when image data of the third page of the document 5 is compressed by the CODEC 106 and the compressed data is to be stored into the HDD 105.

In the fifth embodiment, at the same time, an area capable of storing compressed data 16 MB of the third page of the document 5 is retrieved from any other document than the document 5 subjected to print processing at present (step S507).

In this time, the management information shown in FIG. 7 is used. From the management information, it is known that the other documents stored in the HDD 105 than the document 5 are documents 1, 2, 3, and 4. Among these documents, code data of the document 3 is not stored, and any compressed data of the document 3 cannot be recovered if it is once deleted. Therefore, the compressed data of the document 3 cannot be deleted. As for the document 4, only code data thereof is stored, and therefore, the compressed data cannot be deleted. However, as for each of the documents 1 and 2, both the code data and image data are stored, and therefore, the compressed image data of a page having an appropriate data amount can be erased. That is, since the compressed image data of the third page of the document 5 is 16 MB, the compressed data of the third page of the document 5 can be stored into the HDD 105 by deleting the compressed data 20 MB of the second page of the document 1.

Therefore, the CPU 101 erases the compressed image data of the second page of the document 1 stored in the HDD 105 (step S508), and the compressed data of the third page of the document 5 stored in the memory 102 is stored into the same sector (step S509). In this time, the management information of a printed document on the memory 102 is updated as shown in FIG. 17.

Figures 16, 17:
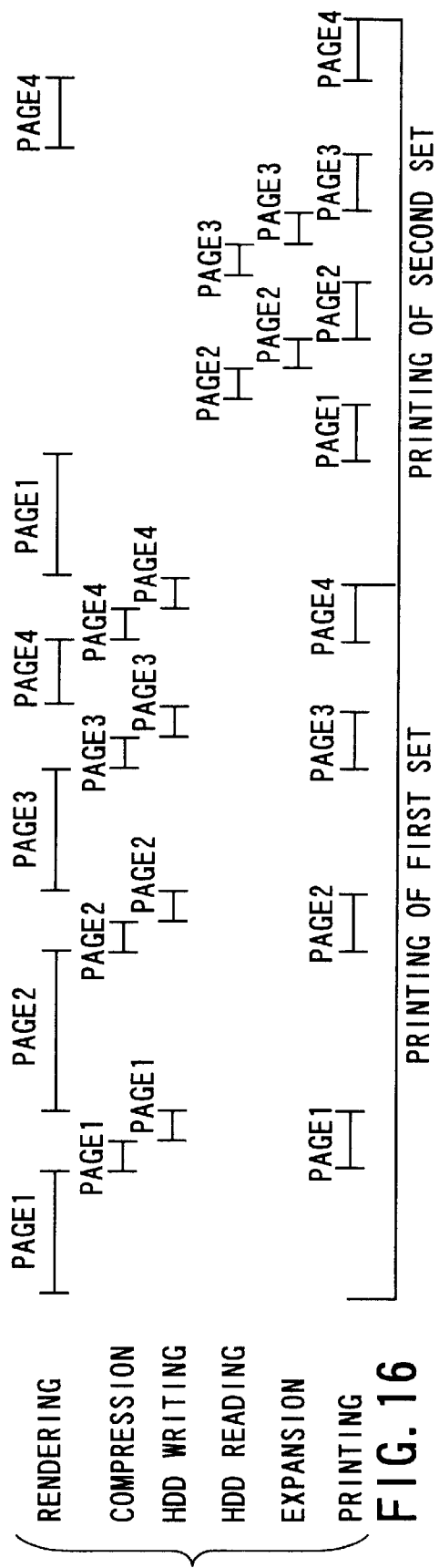
FIG. 16 is a view showing an example of timings of rendering, compression, expansion, HDD writing, HDD reading, and print operation, corresponding to FIG. 15.
FIG. 17 is a view showing an example of management information which is prepared on the memory shown in FIG. 1, and which is updated according to a fifth embodiment.

In the management information shown in FIG. 17, the third page of the document 5 is stored in the HDD 105 at the sector number "25020". Since another document was deleted when storing the third page of the document 5, information (such as flag information) indicating the deletion of the document is stored.

Next, rendering of code data of the fourth page of the document 5 is carried out to prepare image data on the memory 102, and image data is transferred to the printer engine 11 through the printer I/F 108. Thus, printing is carried out (steps S511 to S512 and steps S503 and S510). At the same time, compression is performed by the CODEC 106 (step S504), the compressed image data is once stored into the memory 102, and whether or not the compressed image data can be stored into the HDD 105 is confirmed (step S505).

In this time, since the HDD 105 has a capacity for storing the compressed image data 5 MB of the fourth page of the document 5, compressed image data is read out from the memory 102 and is written into the HDD 105 (step S506). In this manner, printing of the fourth page of the document 5 is completed and printing of the first set of the document 5 is completed. Then, management information as shown in FIG. 17 has been stored on the memory 102.

Next, the operation goes to printing of the second set. As for the second set of the document, it is apparent from the management information shown in FIG. 17 that image data of those pages whose rendering has been completed among all of the first to fourth pages of the document 5 is compressed and stored in the HDD 105. Therefore, at first, the CPU 101 reads out compressed image data of the first page from the HDD 105 and once stores the compressed image data into the memory 102. The compressed image data is transferred to the CODEC 106 and is expanded. Thereafter, the image is stored into the page memory area of the memory 102. The image data is read out from the memory 102 and is transferred to the printer engine 11. Printing of image data of the first page is thus carried out (steps S514 to S516).

Since the second to fourth pages are stored in the HDD 105 as compressed data, like the first page, printing is carried out like in the same manner as described above and a second set of the printed document is obtained (step S513).

Next, the operation goes to processing for recovering the compressed data of the second page of the document 1 which was previously deleted to store the compressed data of the third page of the document 5 into the HDD 105. That is, the code data of the document 1 is read from the HDD 105 and is stored into the memory 102. Further, the CPU 101 interprets the code data stored in the memory 102 and performs rendering processing of only the second page of the document 1, to prepare image data in the page memory area on the memory 102 (step S519). Next, the image data is read out and transferred to the CODEC 106, and compression processing is carried out (step S520) to store once the data into the memory 102. The data is then stored at the sector number 25020 where the data was originally stored in the HDD 105 (step S521). In this manner, it is possible to recover the data of the second page of the document 1.

Figure 19:
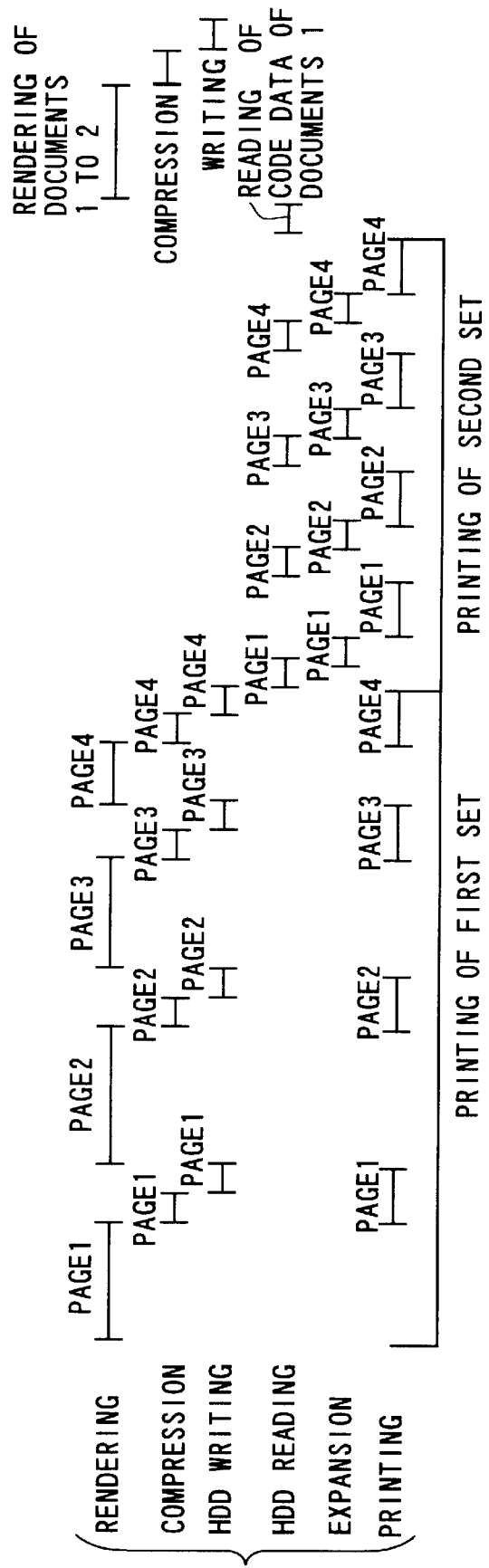
FIG. 19 is a view showing an example of timings of rendering, compression, expansion, HDD writing, HDD reading, and print operation, corresponding to FIG. 18.

According to the fifth embodiment, since image data of all the four pages of the document 5 can be stored into the HDD 105, rendering processing needs not be performed in the print operation of the second and later set of a document, as is apparent from the timing chart shown in FIG. 19. Printing can therefore be performed at a high speed.

As described above, according to the fifth embodiment, if the HDD 105 does not has an empty capacity enough to store the image data (or compressed data) of each page, a file which can be deleted is retrieved from the HDD 105 and is deleted therefrom to prepare an empty capacity. For example, in case where a file has character code data and image data in the HDD 105, the character code data can be reproduced later from the character code data even if the image data is deleted. Such a file which can be deleted is retrieved and is deleted. It is considered that other various data can be deleted than such a file as described above.

Thus, according to the fifth embodiment, in the print operation of the first set, when image data (or compressed data) of every page obtained by rendering code data is stored into the HDD 105, whether or not the HDD 105 has an empty capacity equivalent to the data amount of the compressed data of a page is checked for every page. If there is no empty capacity equivalent to the data amount of the compressed data of any page, and if there is a piece of image data which has a data amount larger than or equal to the amount of the piece of the compressed data of the page to be stored at present and which can be recovered after the data is erased (i.e., code data of the image data is stored), among pieces of compressed image data of pages of any other document stored in the HDD 105, the image data which can be erased is erased and the compressed data of the page to be stored at present is stored into the HDD 105. In this manner, in the print operation of the second and later sets of a document, the previously limited empty capacity of the HDD 105 can be effectively used, and rendering processing needs not be performed in the print operation as for such a page that has image data stored in the HDD 105. Therefore, print operation can be performed at a higher speed.

(Sixth Embodiment)

Consideration will now be taken into a case where the memory 102 of FIG. 1 has a capacity equivalent to two pages of print images. In this case, the page memory is equivalent to two pages, and therefore, rendering of a next page can be performed during printing of a page. That is, a page memory area for one page is used to transfer image data whose rendering has been completed to the printer engine 11 through the printer I/F 108. At the same time, a page memory area for another page is used to perform rendering of the page to be printed next, and the image data thereof is stored.

Suppose that the memory 102 of FIG. 1 has a page memory area equivalent to two pages of print images. For example, rendering of the second page of the document 5 is performed during printing the image data of the first page after completion of rendering of the first page of the document 5, and thus, rendering of a next page is sequentially performed immediately after rendering of a page. Even in this manner, an empty area of only 37 MB remains in the HDD 105 after compressed image data of the first page of the document 5 is stored into the HDD 105, according to the present embodiment. Only the compressed data of the first and second pages of the document 5 can be stored. Therefore, as is apparent from the timing chart shown in FIG. 21(*a*), the memory 102 has a page memory area for only one page until printing of the first page of the second set is completed, and therefore, rendering of the third page cannot be performed. Accordingly, when the rendering time of the third page is longer than the printing time of the second page, an interval time appears until printing of the third page is started after the completion of the second page.

Hence, consideration is taken into the point described above in the sixth embodiment. In case where the page memory are of the memory 102 used for rendering and data developing during printing has a capacity equivalent to two pages, the printing time and the rendering time is compared with each other when image data (which may be compressed) after rendering is stored into the HDD 105, and only such a piece of image data whose rendering time is longer than the printing time is stored into the HDD 105.

Figure 20:
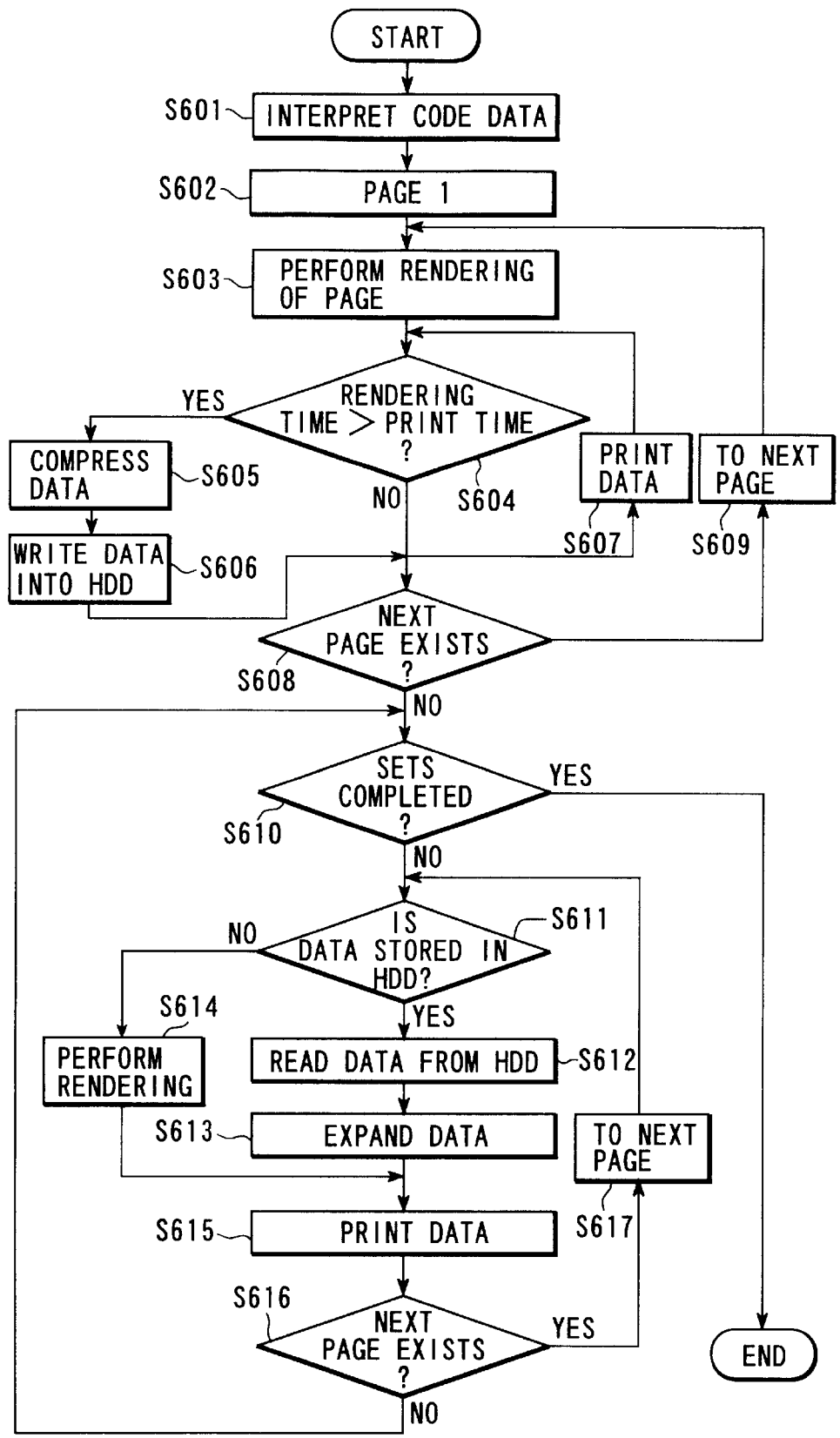
FIG. 20 is a flowchart for explaining a sixth embodiment.

In the following, the sixth embodiment will be explained with reference to the flowchart shown in FIG. 20 and the timing chart shown in FIG. 21(*b*). Explanation will be made with reference to an example in which two sets each consisting of a document 5 are newly printed in case where the storing state of the HDD 105 is in the state shown in FIG. 7, like in the explanation to the first embodiment.

At first, code data of the first page of the document 5 is interpreted and image data is prepared (steps S601 to S603). In this time, the rendering time is measured with use of the timer 104. Upon completion of the rendering, data is transferred to the printer engine 11 through the printer I/F 108 and is then printed (step S607). In this time, the time required for printing is measured with use of the timer 104, or the printing time may be set to a constant time previously predicted. Here, supposing that the rendering time of the first page of the document 5 is shorter than the printing time thereof (step S604), the first page is not stored into the HDD 105 but only the code data thereof is maintained.

In case of the sixth embodiment, the memory 102 has a page memory area equivalent to two pages, and therefore, rendering of the second page is carried out during printing of the first page (steps S608 to S609 and S603). If the rendering time of the second page is longer than the printing time thereof as a result of measuring the rendering time of the second page (step S604), the image data of the second page is stored into the HDD 105 after compression (steps S605 to S606).

During printing the image data of the second page (step S607), rendering of the third page of the document 5 is carried out (steps S608 to S609 and S603), the rendering time is measured by the timer 104. If the rendering time is then longer than the printing time (step S604), the image data is compressed by the CODEC 106, and thereafter, the compressed data is stored into the HDD 105 (steps S605 to S606).

During printing the image data of the third page (step S607), rendering of the fourth page of the document 5 is carried out (steps S608 to S609 and S603) and the rendering time is measured by the timer 104. If the rendering time is shorter than the printing time (step S604), the image data of the fourth page is not stored into the HDD 105.

Next, the operation goes to printing of the second set of the document. As for the first page of the document 5, rendering is carried out with use of code data. In this time, since the memory 102 has a page memory area equivalent to two pages, rendering processing of the first page of the second set of the document is performed while printing the fourth page of the first set of the document 5, to prepare image data on the memory 102 (steps S611 and S614).

As described above, the rendering time is shorter than the printing time as for the first page of the document 5, and therefore, rendering processing is completed before completion of printing of the fourth page of the first set. Immediately after completion of printing of the fourth page of the first set, printing of the first page of the second set is enabled (step S615).

While printing the first page of the second set (step S615), the image of the second page is developed. From the management information, the image data of the second page can be determined as having been stored as compressed data in the HDD 105. The compressed data is once read out from the HDD 105 onto the memory 102 and is expanded by the CODEC 106. Thereafter, the image data is stored into the memory 102 (steps S611 to S613). Therefore, after completion of printing of the first page of the second set, printing of the second page is started (step S615).

While printing the second page of the second set (step S615), the image of the third page is developed. From the management information, the image data of the third page can be determined as having been stored as compressed data in the HDD 105. The compressed data is once read out from the HDD 105 onto the memory 102 and is expanded by the CODEC 106. Thereafter, the image data is stored into the memory 102 (steps S611 to S613). Therefore, after completion of printing of the second page of the second set, printing of the third page is started (step S615).

While printing the third page of the second set (step S615), the image data of the fourth page is prepared on the memory 102. In this time, according to the management information, the fourth page is not stored in the HDD 105, and therefore, rendering from the code data stored in the memory 102 is carried out to prepare image data. Printing is then carried out (steps S611, S614, and S615). Since the time required for the rendering processing is shorter than the printing time, printing of the fourth page is enabled immediately after completion of printing of the third page of the second set, and printing of the second set is thereby completed.

Figure 21:
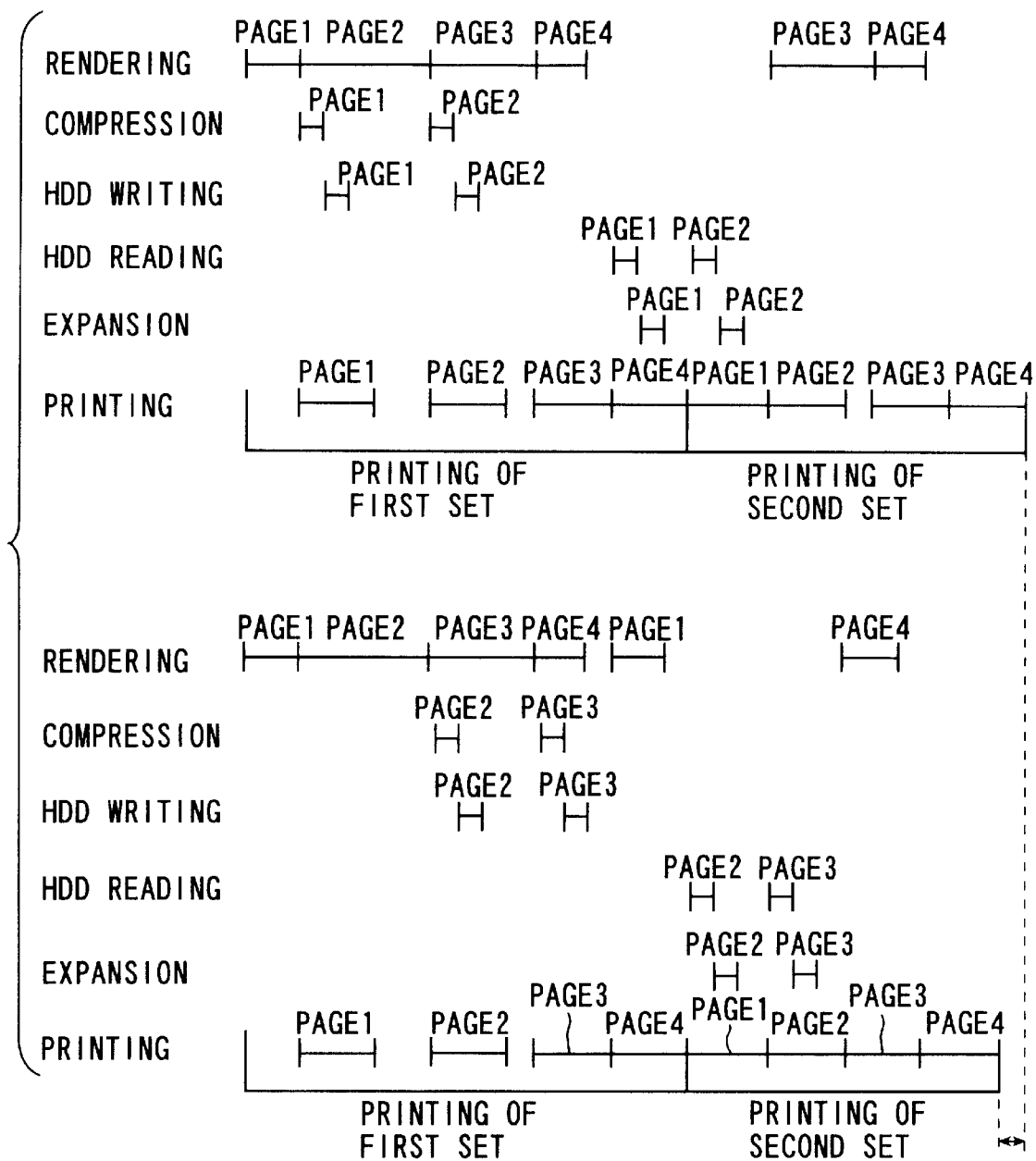
FIG. 21 is a view showing an example of timings of rendering, compression, expansion, HDD writing, HDD reading, and print operation, corresponding to FIG. 20.

By storing only such a piece of image data that has a longer rendering time than the printing time into the HDD 105, the page memory area of the memory 102 equivalent to two pages can be effectively used as is apparent from the timing chart shown in FIG. 21(*b*). Therefore, pages can be sequentially printed without an interval time.

As described above, according to the sixth embodiment, the rendering time and the printing time are compared with each other, and such a page that requires a rendering time shorter than its printing time is not stored into the HDD. This is based on the following ground. If rendering processing of a page is performed in parallel during printing processing of another page, the entire print processing time is not elongated by the rendering processing as far as the rendering time of a page is shorter than the printing time thereof. Therefore, in this case, even if image data once developed is stored into the HDD and is used for the second and later sets, the processing time is the same as that in case where the image data is stored and used for the second and later sets. For the purpose of saving the storage capacity of the HDD, image data is not stored into the HDD 105. In this manner, the storage capacity of the HDD can be saved and a large amount of image data can be stored. Therefore, necessary shortening of the time can be enabled efficiently.

Although embodiments of the present invention have been explained above, the memory section for storing image data (which may be compressed) obtained by rendering needs not always be a HDD but may be, for example, a semiconductor memory, an optical disk, or an arbitrary storage medium.

The embodiments are not limited to code data 1 for a printer, such as PDL, but it is possible to use code data dependent on an application for a PC, such as data of WORD format, ICHITARO format, or the like.

Further, any print control method described in the above embodiments can be distributed as a program which can be executed by a computer and can be stored in a magnetic disk (such as a floppy disk or hard disk), an optical disk (such as a CD-ROM or DVD), a semiconductor memory or the like. For example, in case of the structure shown in FIG. 1, the program described in the embodiment is stored in the HDD 105 and the CPU 101 executes the print control operation as shown in the embodiment.

As has been described above, according to the fourth embodiment, the rendering time of each page is measured, and a document is erased in the order from the document which requires a shorter rendering time and is replaced with a new document. As a result of this, the rendering time of a page having image data which could not be stored into the HDD 105 can be shortened when printing the second and later sets of a document. Therefore, printing can be performed at a high speed as a whole.

In addition, according to the fifth embodiment, image data stored in the HDD 105 or compressed data obtained by compressing image data and also stored in the HDD 105 is erased and new image data is stored, since it is easy to prepare image data from code data with respect to a document whose code data is stored. In this manner, electronic sorting of a plurality of sets is enabled.

According to the sixth embodiment, data is erased in the order from the data of the page having the largest data amount when erasing data. In this manner, a large amount of data can be stored in the HDD 105.

Image data of another document than the document being printed at present is temporarily erased, and the memory storage thus erased is used to store image. In this manner, a plurality of sets of documents can be printed by rendering for one time, even if the HDD 105 has no enough empty capacity.

Thus, in case where the HDD 105 has no enough empty capacity, high speed printing is enabled.

As described above, according to the present invention, a plurality of sets of documents can be printed at a high speed by efficiently storing image data (or print data) after rendering in consideration of the data amount, rendering time, and the like of the image data.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    a rendering function unit which performs a rendering process and outputs image data for each page corresponding to inputted code data;
    a memory which stores the image data outputted by the rendering function unit;
    a printing engine which prints one of image data outputted from the rendering function unit and image data stored in the memory;
    a comparing function unit which compares an amount of the image data with an empty capacity of the memory and produces a comparison result; and
    a controller which controls the memory and the printing engine and changes a printing method in accordance with the comparison result of the comparing function unit.

2. An image forming apparatus according to claim 1, wherein:
    the controller controls the memory and the printing engine, such that when the empty capacity of the memory is larger than the data amount, the image data outputted from the rendering function unit is stored in memory, and the printing engine prints the image data stored in the memory, and
    the controller controls the rendering function unit and the printing engine, such that when the empty capacity is smaller than the amount of the image data, the rendering function unit performs the rendering process again so as to output image data corresponding the inputted code data and the printing engine prints the image data subjected to the rendering process again.

3. An image forming apparatus according to claim 1, wherein
    the controller compares the amount of the image data and the empty capacity of the memory each time the rendering function unit prepares the image data, and controls the rendering function unit and the printing engine such that the image data is stored in the memory when the empty capacity is larger than the amount of the image data, and
    the controller controls the rendering function unit, the memory, the printing engine, and the comparing function unit, when the amount of the image data is larger than the empty capacity of the memory, such that the image data is prevented from being stored in the memory.

4. An image forming apparatus according to claim 1, wherein
    the controller compares an amount of image data and the empty capacity of the memory, and controls the memory to store the image data when the empty capacity of the memory is larger than the amount of the image data, and the controller controls the rendering function unit, the memory, the printing engine, and the comparing function unit, such that when the empty capacity of the memory is smaller than the amount of the image data, a largest of a plurality of different image data stored in the memory, is erased from the memory.

5. An image forming apparatus according to claim 1, wherein the controller compares an amount of the image data and the empty capacity of the memory, and controls the memory to store the image data when the empty capacity is larger than the amount of the image data, and the controller controls the rendering function unit, the memory, the printing engine, and the comparing function unit, such that when the empty capacity of the memory is smaller than the amount of the image data, one of a plurality of image data stored in the memory which requires a shortest time for preparation by the rendering function unit, is erased from the memory.

6. An image forming apparatus according to claim 1, wherein the controller compares an amount of the image data and the empty capacity of the memory, and controls the memory to store the image data when the empty capacity is larger than the amount of the image data, and the controller controls the rendering function unit, the memory, the printing engine, and the comparing function unit, such that when the empty capacity is smaller than the amount of the image data, erasable data stored in the memory is erased therefrom and the image data is stored in the memory.

7. An image forming apparatus according to claim 1, wherein:

the controller compares a first time required for preparation of image data corresponding to each page performed by the rendering function unit, and a second time required for printing of the image data corresponding to each page performed by the printing engine, and controls the memory to store the image data when the first time is longer than the second time, and the controller controls the rendering function unit, the memory, the printing engine, and the comparing function unit, such that the image data is prevented from being stored in the memory when the second time is longer than the first time.

8. An image forming apparatus according to claim 1, wherein the change in printing method comprises selectively supplying the printing engine with image data from one of the memory and the rendering function unit.

9. An image forming method comprising:

rendering and outputting image data for each page corresponding to inputted code data using a rendering function unit;

memorizing the image data outputted by the rendering function unit in a memory;

comparing an amount of the image data with an empty capacity of the memory and producing a comparison result; and controlling the memory and a printing engine and using the printing engine to print one of a) image data outputted from the rendering function unit and b) image data stored in the memory depending on the comparison result.

10. An image forming method according to claim 9, wherein the controlling of the memory and the printing engine is such that:

a) when the empty capacity of the memory is larger than the data amount from the rendering function unit, the image data outputted from the rendering function unit is stored in memory, and the printing engine prints the image data stored in the memory, and b) when the empty capacity is smaller than the amount of the image data, the rendering function unit performs the rendering process again so as to output image data corresponding the inputted code data and the printing engine prints the image data subjected to the rendering process again.

11. An image forming method according to claim 9, wherein the controlling of the memory and the printing engine comprises:

comparing the amount of the image data and the empty capacity of the memory each time the rendering function unit prepares image data, storing the image data in the memory when the empty capacity of the memory is larger than the amount of the image data, and preventing image data from being stored in the memory when the amount of the image data is larger than the empty capacity of the memory.

12. An image forming method according to claim 9, wherein the controlling of the memory and the printing engine comprises:

comparing an amount of image data and the empty capacity of the memory, storing the image data in the memory when the empty capacity of the memory is larger than the amount of the image data, and erasing the largest one of a plurality of different data stored in the memory when the empty capacity of the memory is smaller than the amount of the image data.

13. An image forming method according to claim 9, wherein the controlling of the memory and the printing engine comprises:

comparing an amount of the image data and the empty capacity of the memory, controlling the memory to store the image data when the empty capacity is larger than the amount of the image data, and erasing one of a plurality of image data stored in the memory which requires a shortest time for preparation by the rendering function unit when the empty capacity of the memory is smaller than the amount of the image data.

14. An image forming method according to claim 9, wherein the controlling of the memory and the printing engine comprises:

comparing an amount of the image data and the empty capacity of the memory, controlling the memory to store the image data when the empty capacity is larger than the amount of the image data, and erasing erasable data stored in the memory when the empty capacity is smaller than the amount of the image data and storing the image data in the memory.

15. An image forming method according to claim 9, wherein the controlling of the memory and the printing engine comprises:

comparing a first time required for preparation of image data corresponding to each page performed by the rendering function unit, and a second time required for printing of the image data corresponding to each page performed by the printing engine, storing image data in the memory when the first time is longer than the second time, and preventing image data from being stored in the memory when the second time is longer than the first time.

16. An image forming apparatus comprising:

a rendering function unit which performs a rendering process and outputs image data for each page corresponding to inputted code data;

a memory which stores the image data outputted by the rendering function unit;

a printing engine which prints one of image data outputted from the rendering function unit and image data stored in the memory;

a printing engine which prints one of image data outputted from the rendering function unit and image data stored in the memory;

a comparing function unit which compares a first time required for preparation of image data corresponding to each page performed by the rendering function unit, and a second time required for printing of the image data corresponding to each page performed by the printing engine, and controls the memory to continuing storing the image data when the first time is longer than the second time, and a controller which controls the rendering function unit, the memory, the printing engine, and the comparing function unit, such that the image data is prevented from being stored in the memory when the second time is longer than the first time.

17. An image forming method comprising:

rendering and outputting image data for each page corresponding to inputted code data using a rendering function unit;

storing the image data outputted by the rendering function unit in a memory;

comparing a first time required for preparation of image data corresponding to each page performed by the rendering function unit, and a second time required for printing of the image data corresponding to each page performed by a printing engine, continuing storing the image data in the memory when the first time is longer than the second time, and preventing the image data from being stored in the memory when the second time is longer than the first time.

* * * * *